(12) United States Patent
Caron et al.

(10) Patent No.: US 11,299,124 B2
(45) Date of Patent: Apr. 12, 2022

(54) MOTOR FOR AUDIBLE SOUND IN MOTOR VEHICLE

(71) Applicant: Magna Closures Inc., Newmarket (CA)

(72) Inventors: Stephen James Caron, Aurora (CA); Gabriele Wayne Sabatini, Keswick (CA)

(73) Assignee: MAGNA CLOSURES INC., Newmarket (CA)

( * ) Notice: Subject to any disclaimer, the term of this patent is extended or adjusted under 35 U.S.C. 154(b) by 20 days.

(21) Appl. No.: 16/815,518

(22) Filed: Mar. 11, 2020

(65) Prior Publication Data

US 2020/0298790 A1    Sep. 24, 2020

Related U.S. Application Data

(60) Provisional application No. 62/820,391, filed on Mar. 19, 2019.

(51) Int. Cl.
*B60R 21/34* (2011.01)
*B60Q 9/00* (2006.01)
*B60Q 5/00* (2006.01)

(52) U.S. Cl.
CPC .............. *B60R 21/34* (2013.01); *B60Q 5/005* (2013.01); *B60Q 9/00* (2013.01); *B60Q 5/001* (2013.01)

(58) Field of Classification Search
CPC .......... B60Q 9/008; B60Q 1/52; B60Q 1/525; B60Q 5/006; G10K 2210/128; H04B 1/082
USPC .................................................. 381/86, 71.4
See application file for complete search history.

(56) References Cited

U.S. PATENT DOCUMENTS

| | | | | |
|---|---|---|---|---|
| 5,170,435 A | * | 12/1992 | Rosen | B60R 11/0217 |
| | | | | 181/144 |
| 7,189,211 B2 | * | 3/2007 | Inada | A61H 23/0263 |
| | | | | 601/47 |
| 10,266,111 B2 | | 4/2019 | Prescott et al. | |
| 2018/0339652 A1 | * | 11/2018 | Prescott | B60N 2/20 |

* cited by examiner

*Primary Examiner* — George C Monikang
(74) *Attorney, Agent, or Firm* — Dickinson Wright PLLC

(57) ABSTRACT

A vehicle system to produce audible sound includes at least one auxiliary motor to mechanically operate of a vehicle component based on a control signal and to produce an audible sound without mechanically operating the vehicle component, and a controller to output a motion control signal to control operation of the at least one auxiliary motor and to output an auditory control signal to actuate the at least one auxiliary motor to produce the audible sound. A waveguide is provided in communication with the at least one auxiliary motor and in sonic resonance with sound produced by the auxiliary motor to amplify and/or to modify the audible sound.

20 Claims, 13 Drawing Sheets

MOTOR FOR AUDIBLE SOUND IN MOTOR VEHICLE

CROSS-REFERENCE TO RELATED APPLICATIONS

This application claims the benefit of U.S. Provisional Application No. 62/820,391, filed Mar. 19, 2019, and titled "Motor for Audible sound in Motor Vehicle," which is hereby incorporated by reference in its entirety.

FIELD

The present disclosure relates to generally to motor vehicles and systems thereof including motor produced audible sounds.

BACKGROUND

Motor vehicles can provide alerts to drivers, passengers and people external to the vehicle using bells, chimes, and speakers. Such alerts may remind passengers to fasten seat belts or warn a driver that their turn signal is on. The alerts may improve vehicle safety or user experience.

SUMMARY

This section provides a general summary of the present disclosure and is not a comprehensive disclosure of its full scope or all of its features, aspects and objectives.

In accordance with one aspect of the disclosure, a system comprises at least one auxiliary motor configured to mechanically operate a vehicle component based on a motion control signal, and a controller configured to output an auditory control signal independent of the motion control signal. The auditory control signal causes the at least one auxiliary motor to produce an audible sound.

In accordance with another aspect of the disclosure, the controller is further configured to output the motion control signal.

In accordance with another aspect of the disclosure, the at least one auxiliary motor includes an interior motor mounted within a vehicle cabin and adapted to produce the audible sound in the vehicle cabin. In accordance with another aspect of the disclosure, the interior motor includes at least one motor selected from a group comprising: a seat motor, a sunroof motor, a door latch motor, and a window regulator motor. In accordance with another aspect of the disclosure, the at least one auxiliary motor includes two interior motors, with each of the two interior motors mounted in the vehicle cabin and adapted to produce the audible sound in the vehicle cabin.

In accordance with another aspect of the disclosure, the at least one auxiliary motor includes an exterior motor mounted outside a vehicle cabin and adapted to produce the audible sound external to the vehicle. In accordance with another aspect of the disclosure, the exterior motor includes at least one motor selected from a group comprising: a trunk latch motor, a side mirror motor, a hood latch motor, and a headlight motor. In accordance with another aspect of the disclosure, the at least one auxiliary motor includes two exterior motors, with each of the two exterior motors mounted outside the vehicle cabin and adapted to produce the audible sound external to the vehicle. In accordance with another aspect of the disclosure, the vehicle further includes a waveguide in communication with the exterior motor and configured to guide a sound wave from the exterior motor outwardly from the vehicle cabin.

In accordance with another aspect of the disclosure, the controller is configured to receive a signal from a key fob and to output the auditory control signal in response thereto.

In accordance with another aspect of the disclosure, the vehicle system further comprises a waveguide in communication with the at least one auxiliary motor to amplify and direct the audible sound. In accordance with another aspect of the disclosure, the waveguide is part of an electromagnetic shielding for the motor or related circuitry. In accordance with another aspect of the disclosure, the waveguide is configured to resonate a sound produced by the auxiliary motor to amplify the audible sound.

In accordance with another aspect of the disclosure, the output controller is configured to output the auditory control signal as an alternating electrical waveform to oscillate the auxiliary motor in a forward direction and a reverse direction so as to not mechanically operate the at least one vehicle component.

In accordance with another aspect of the disclosure, the vehicle system further comprises a sensor configured to detect an alert-triggering event in one of a plurality of alert zones around the vehicle, and the controller is configured to output the auditory control signal to activate corresponding ones of the at least one auxiliary motor to produce the audible sound in the one of the plurality of alert zones in response to detection of the alert-triggering event. In accordance with another aspect of the disclosure, the sensor may be a safety sensor configured to detect the alert-triggering event as a person or an object crossing a path of the vehicle.

In accordance with another aspect of the disclosure, the at least one auxiliary motor includes a first motor and a second motor, and wherein the controller is configured to output the auditory control signal cause the second motor to produce the audible sound to cancel a noise produced by the first motor.

In accordance with another aspect of the disclosure, a vehicle system to produce audible sound is provided. The vehicle system comprises at least one auxiliary motor configured to mechanically operate a vehicle component based on a motion control signal and to produce an audible sound; and a controller configured to output at least one of the motion control signal or an auditory control signal to actuate the at least one auxiliary motor to produce the audible sound while the vehicle component is not operated.

In accordance with another aspect of the disclosure, a method of generating an audible sound in proximity to a motor vehicle is provided. The method comprises the steps of: transmitting an auditory control signal to a motor of a vehicle component mounted to the motor vehicle; and producing the audible sound by at least one of a rotor or a motor winding of the motor in response to the auditory control signal.

In accordance with another aspect of the disclosure, the method further comprises the steps of transmitting a motion control signal to the motor of the vehicle component, and optionally when not transmitting the auditory control signal; and mechanically actuating the vehicle component by the motor in response to the motion control signal.

The above aspects of the disclosure describe a motor vehicle system with motor-produced audible sounds, however, the present disclosure is applicable to other devices and structures that include motors and which can be used to produce audible sounds.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF EXAMPLE EMBODIMENTS

Figure 1A:
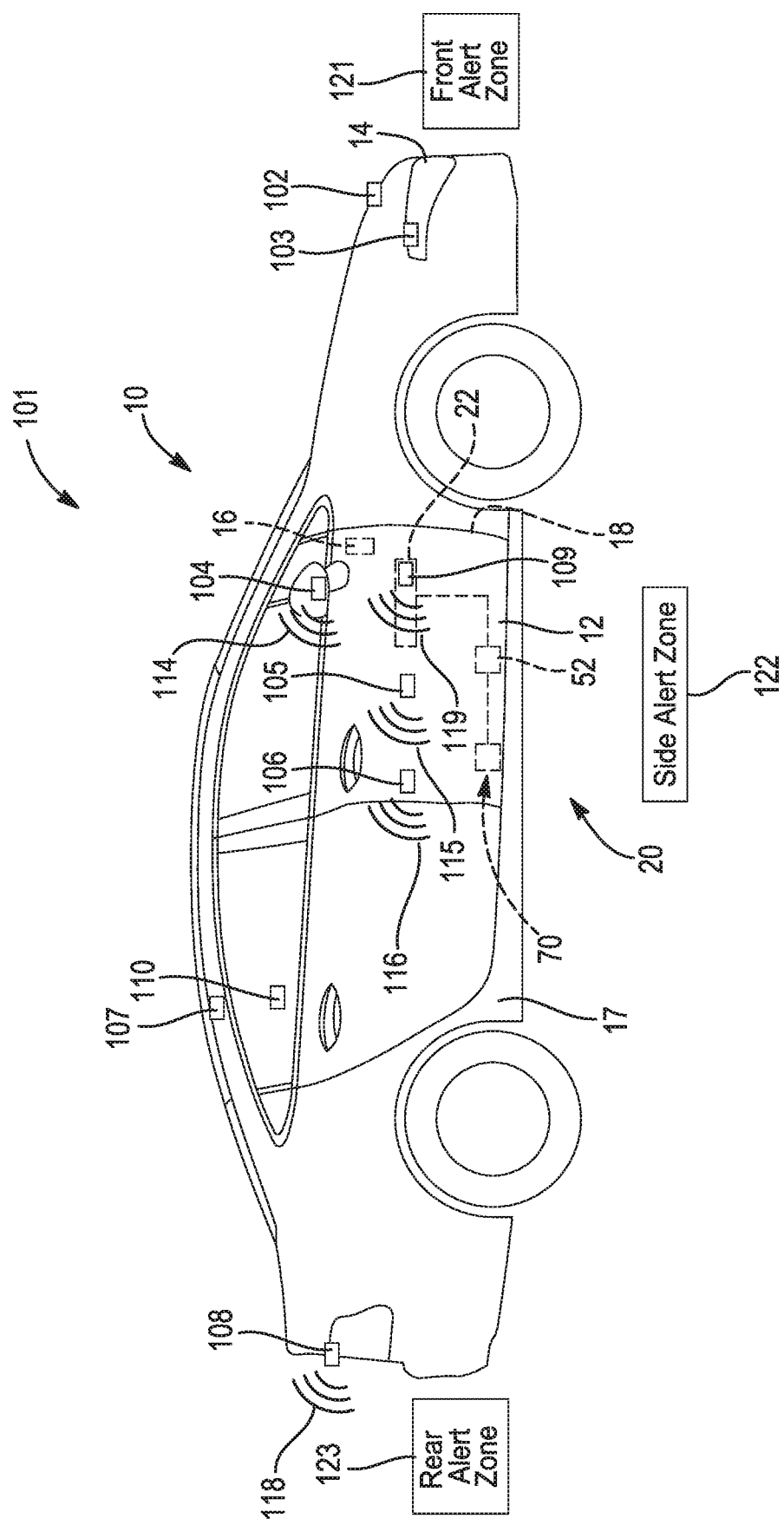
FIG. 1A is a schematic view of a vehicle in accordance with the present disclosure.

In general, example embodiments of a vehicle system to produce audible sounds in accordance with the teachings of the present disclosure will now be disclosed. The audible sounds can be produced by auxiliary motors, which motors have other operations in the vehicle. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the present disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Vehicles and vehicle systems can produce audible sounds using non-drivetrain motors mounted in the vehicle. The non-drivetrain motors can be auxiliary motors, which perform non-drivetrain functions in the vehicle. The motor and the electrical coils located on the vehicle can create audio alerts broadcast to pedestrians and members of the general public during turning or other situations, e.g., when reversing or other drive situations.

FIG. 1A shows a schematic view of a vehicle 101 in accordance with the present disclosure. The vehicle 101 is shown as a passenger vehicle, however, the present disclosure is not so limited. The present disclosure can be adapted to other motor vehicles. The vehicle 101 includes at least one auxiliary motor 102-109, 142 to control operation of various vehicle components and systems. An auxiliary motor is not the internal combustion engine or the electrical traction motors for vehicle propulsion. The auxiliary motors 102-109, 142 operate other vehicle components, such as power-operated accessories (e.g. power-operated windows, locks, seats, wiper motors, etc.) and are typically powered by the system battery or alternator (e.g., 12 volt systems), referred to as a power supply 7. A hood latch motor 102, which may also be called a remote latch motor, is positioned at the front of the vehicle and operates to release or latch the hood to provide access to or cover the engine or a forward storage compartment depending on the vehicle type. The hood latch motor 102 may also operate to ratchet the hood into the closed position. The hood latch motor 102 may operate in response to a remote latch signal, such as a press of a button in the vehicle and/or on a key fob 405. A headlight motor 103 can perform various functions. For example, the headlight motor 103 can operate hidden headlamps to rotate headlamps vertically between a stored, retracted position, typically flush with the hood or front end of vehicle and a use, extended position. As another example, the headlight motor 103 can horizontally rotate the headlamps when turning the vehicle to direct illumination in the direction of the turn. A side mirror motor 104, which may also be called an outside mirror motor, operates to adjust the position of an exterior rearview mirror so that the driver has a view behind and to the side of the vehicle 101. A window regulator motor 105 operates to move the windows up and down in the door. A door latch motor 106 operates to latch the door in the closed position and release the door when ingress or egress into the vehicle cabin is desired. A sunroof motor 107 operates the sunroof between a closed position and an open position. A trunk latch motor 108, which may also be called a remote latch motor, can operate to close the trunk and/or to latch the trunk in a closed position. The trunk latch motor 108 may operate in response to a remote latch signal, such as a press of a button in the vehicle and/or on a key fob 405. The trunk latch motor 108 can also operate to release the trunk. The vehicle 101 can also have a microphone, e.g., an interior microphone or an exterior microphone, to detect sound within the vehicle cabin or outside the vehicle 101. The vehicle 101 can also include power swing door motor 109, which may also be called a power swing actuator 109, which can operate to open and/or close a door, such as the passenger door 12.

Each of the motors 102-108 generate sound when operated, e.g., when power is supplied to the motor. The sound is represented in FIG. 1A at 114-116 and 118 with the motors 104-106 and 108 being active.

The vehicle 101 also defines a plurality of alert zones 121, 122, 123 around the vehicle. A front alert zone 121 is forward of the vehicle. Various motors, e.g., the hood latch motor 102, the headlight motor 103, etc., located toward the front of the vehicle 101 can selectively produce an audible sound directed to the front alert zone 121. Left and right side alert zones 122 are on the respective sides of the vehicle. Various motors, e.g., the side mirror motor 104, the window regulator motor 105, the door latch motor 106, and the power swing door motor 109, etc., located toward a side of the vehicle 101 can selectively produce an audible sound directed to a corresponding one of the side alert zones 122. While FIG. 1A shows one side of the vehicle 101, the other side of the vehicle can be a mirror image with similar or identical layout of motors. A rear alert zone 123 is rearward of the vehicle 101. Various motors, e.g., the sunroof motor 107 and the trunk latch motor 108, etc., located toward the rear of the vehicle 101 can selectively produce an audible sound directed to the rear alert zone 123. In the embodiment illustrated in FIG. 1A, the side alert zone 122 and the rear alert zone 123 are receiving the audible sounds 114-116, 118, and 119 and, respectively, from the vehicle 101.

In some embodiments, a sensor 411 is configured to detect an alert-triggering event in one of the alert zones 121, 122, 123 around the vehicle 101. The alert-triggering event may include, for example, activation of a key fob. Alternatively or additionally, the alert-triggering event may include a safety alert generated in response to detection of a person or an object crossing a path of the vehicle 101 while the vehicle 101 is in motion, or a path of a closure panel of the vehicle while the closure panel is in motion e.g. opening or closing. Such motion may include the vehicle 101 being driven and/or motion of a part of the vehicle 101, such as opening or closing of a door, a window, or a liftgate, examples of closure panels. The safety alert event may be generated by a safety sensor type of sensor 411, which may include specialized hardware and/or software providing for redundant or fault-tolerant operation. The controller may be configured to output an auditory control signal to activate corresponding motors associated with the corresponding one of the alert zones 121, 122, 123 to generate the audible sound in the corresponding one of the alert zones 121, 122, 123. For example, the controller may cause motors associated with the rear alert zone 123 to generate the audible sound in response to a sensor 411 detecting a person or object approaching the vehicle 101 from the rear.

Each of the auxiliary motors 102-109, 142 are controlled by one or more controllers. The controllers may include circuitry and/or software to receive inputs and output control signals to control operation of the auxiliary motors 102-109, 142. The controllers can include local control circuitry to operate corresponding ones of the auxiliary motors 102-109, 142 and thus actuate associated vehicle components. The controllers may receive input signals from local activators, e.g., buttons, slides, levers, switches and the like. When activated the controller sends a motion control signal to control operation of the at least one auxiliary motor 102-109, 142. For example, the driver may depress a hood release button in the vehicle cabin, the hood latch motor 102 activates and releases the hood latch so the hood can be opened. The driver may turn the steering wheel, which activates controller to send a corresponding motion control signal to the headlight motor 103 in order to rotate the headlights in the direction of the turn. The driver may adjust the side mirror by depressing switches in the vehicle cabin to cause the controller send a corresponding motion control signal to the side mirror motor(s) 104, thereby adjusting a position of the side mirror. Similar actions can be taken for the window regulator motor 105, the window regulator motor 105, the sunroof motor 107, the trunk latch motor 108, and the power swing door motor 109. These are examples of auxiliary motors 102-109, 142. The present disclosure is not limited to only these motors and other motors may be used in the present disclosure to produce audible sounds as described herein.

The controllers can also include global circuitry (e.g., a central controller) that can send an auditory control signal when a sensor provides a sensed signal that triggers the audible sound or when the global circuitry senses an event.

Figure 1B:
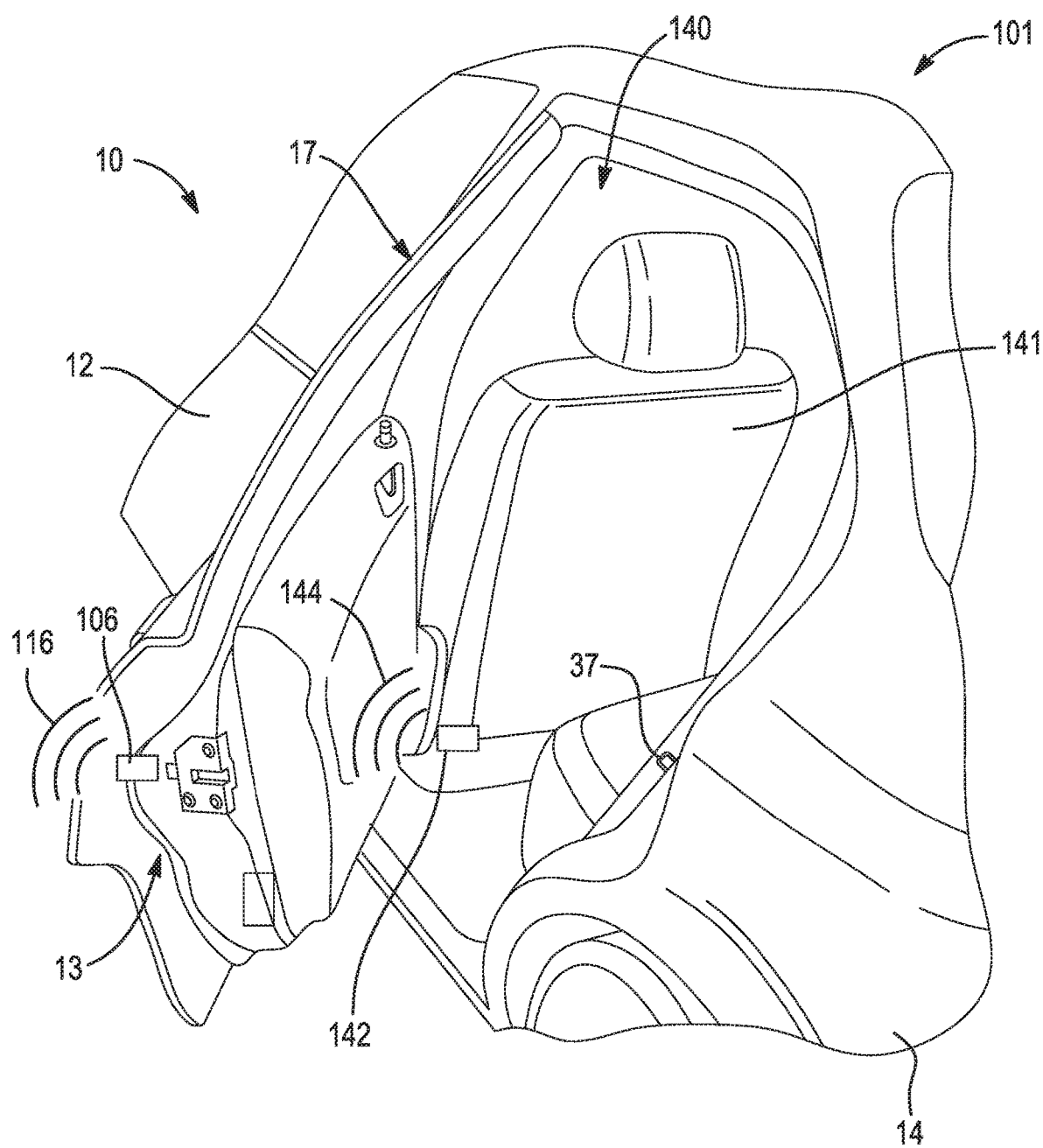
FIG. 1B is a schematic view of a vehicle cabin in accordance with the present disclosure.

FIG. 1B is a schematic view of a vehicle cabin 140 in accordance with the present disclosure. A seat 141 is positioned in the vehicle cabin 140 and is positioned to support a person in the vehicle cabin 140. The seat 141 includes a seat motor 142 that can be actuated by a controller to move the seat using electrical signals. Each of the seats in the vehicle cabin 140 can include at least one actuator. Seats 141 can each include a plurality of seat motors 142, which can slide the seat longitudinally in the vehicle cabin 140, recline the seat back, raise and lower the seat base, extend and retract thigh supports, perform massaging functions, raise and lower the headrest, and the like. Each of these motors 142 can be used to produce an audible sound. Other motors in the vehicle cabin 140 can include motors to adjust pedals in the vehicle 101, motors to adjust the steering wheel, fan motors and the like. Controllers are provided to control the operation of the seat motors 142. The seat motors 142 can produce an in-cabin sound wave at 144. The interior motors are examples and the present disclosure is not limited to only these interior motors and other interior motors may be used in the present disclosure to produce audible sounds as described herein.

Various features of a vehicle including motor systems are described in U.S. Patent Application Publication No. 2018/0179788, titled Power Door Presenter with Latching Feature, which is hereby incorporated by reference. This publication includes a first passenger door 12 pivotally mounted to a vehicle body 14 via an upper door hinge 16 and a lower door hinge 18 which are shown in phantom lines. A power door actuation system 20 is associated with the pivotal connection between first passenger door 12 and vehicle body 14. The power door actuation system 20 includes a power door presenter system 70, a swing vehicle door ECU 52, a primary latch assembly 13, and can also be configured with a power-operated swing door actuator 22 secured within an internal cavity of passenger door 12 for coordinated control of the opening and closing of the door 12. The motor vehicle 101 illustrated in FIG. 1A may be provided as not including outside vehicle door handles on the vehicle door 12, and also in an alternate embodiment, outside door handles may be provided.

Each of upper door hinge 16 and lower door hinge 18 include a door-mounting hinge component and a body-mounted hinge component that are pivotably interconnected by a hinge pin or post. While power door actuation system 20 is shown in FIG. 1A in association with the front passenger door 12, those skilled in the art will recognize that the power door actuation system 20 can also be associated with any other door, such as rear passenger doors 17, as shown in FIG. 1B, or also be associated with a lift gate (not shown), a hood 9, or a deck lid 19. Also, while the door 12 is illustrated herein as being pivotally mounted to the vehicle body 14 for rotation relative to a vertical axis, it may be configured for rotation about a horizontal axis as would be the case for a lift gate, or other offset axis, or the like. For greater clarity, the vehicle body 14 is intended to include the 'non-moving' structural elements of the vehicle 101 such as the vehicle frame, structural support pillars and members, and body panels.

The vehicle 101 includes a primary closure latch assembly 13 for vehicle doors 12, 17. Closure latch assembly 13 can be positioned on vehicle door 12, 17 and arranged in a suitable orientation to engage a primary first striker, referred to hereafter as striker 37, mounted on vehicle body 14, when door 12, 17 is closed. Closure latch assembly 13 includes a latch mechanism having a ratchet and a pawl, a latch release mechanism having a pawl release lever, an inside door release mechanism having an inside release lever, a power release actuator for controlling powered actuation of the latch release mechanism, and a power lock actuator having a lock mechanism and an electric lock motor. The ratchet is movable between two striker capture positions including primary or fully closed position and secondary or partially closed position whereat ratchet retains the striker 37, and a striker release position whereat ratchet permits release of striker from a fishmouth provided by a latch housing of primary latch assembly 13. Any of the electrically powered structures can be powered to produce a sound for an audible sound and not the actually perform its principal mechanical function.

Figure 2:
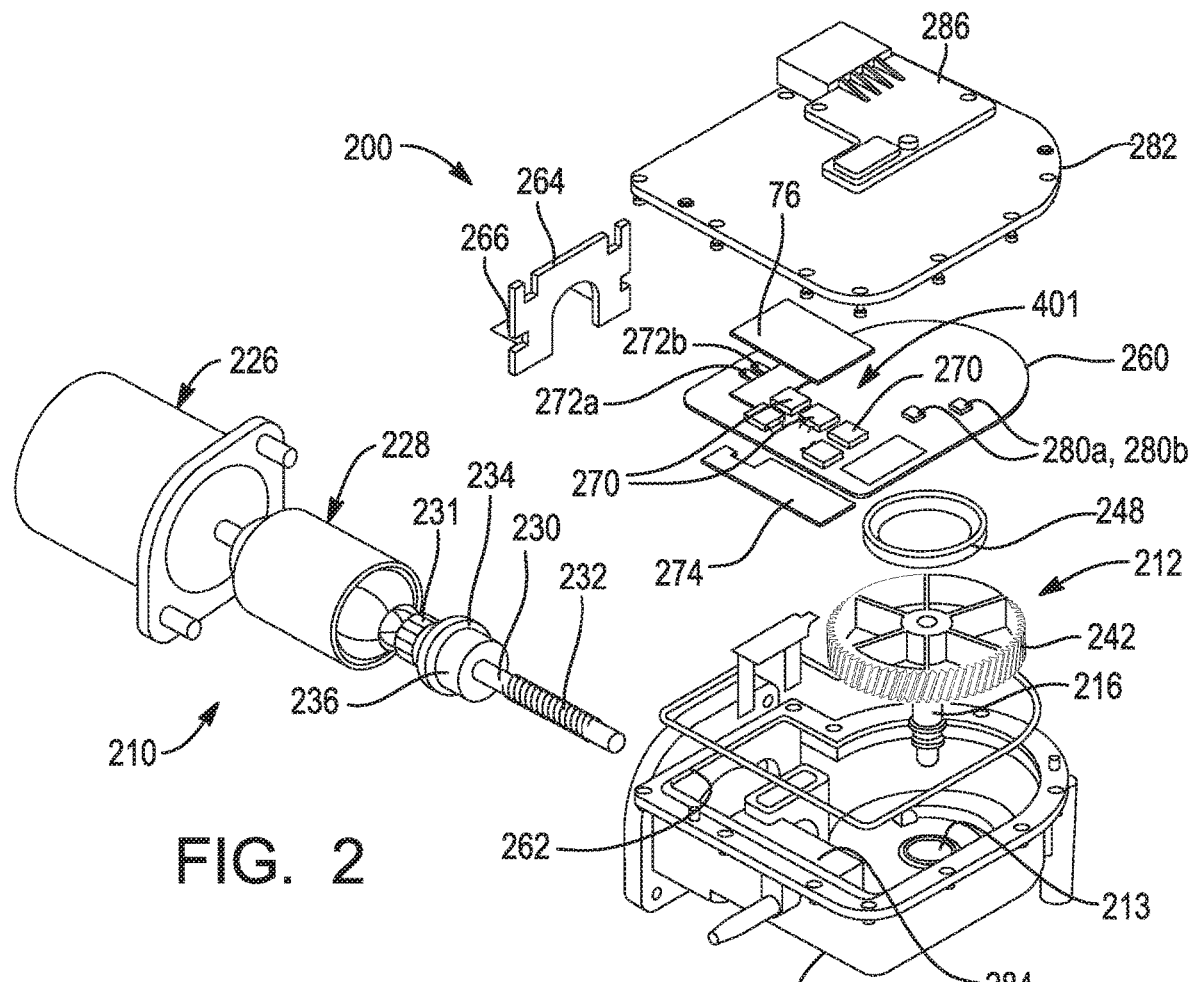
FIG. 2 is a schematic view of a motor in a vehicle in accordance with the present disclosure.

FIG. 2 is a schematic view of a motor assembly 200 for a vehicle in accordance with the present disclosure. The motor assembly 200 includes an electric motor 210 having a stator 226 and a rotor 228. Any or all of the auxiliary motors 102-109, 142 can be implemented using the electric motor 210. The electric motor 210 can be a conventional AC or DC motor as shown in the drawings or as known in the art. The rotor 228 includes a rotating shaft 230 which is rotatably supported in the housing 212 via a ball bearing 236 fitted in a groove formed in the housing. The shaft 230 carries a ring-like commutation bar 231 and, in one embodiment, a multi-polar ring magnet 234 for position sensing purposes. The shaft 230 also includes an integral worm 232 which, in assembly, meshes with a worm gear 242 that is integrally formed on the output shaft 216. This arrangement allows for gear ratios on the order of 70:1, hence reducing the torque requirements of the motor.

As a result of the direct connection between the worm 232 and worm gear 242, driving the motor 210 in one rotational sense causes the output shaft 216 and wiper arms to rotate in one rotational sense and driving the motor in the opposite rotational sense causes the output shaft and wiper arms to rotate in the opposite rotational sense. As described in greater detail below, the motor is controlled such that the worm gear 242 rotates less than 360°. In the event of a control system failure, the worm gear 242 includes a tab which will abut against fail-safe stops formed in the housing 212, thus providing a physical limitation to the angular travel of the worm gear 242 and the wiper arms 220. The tab preferably includes metal inserts which serve to strengthen the tab against sheer forces.

In an example embodiment, the worm gear 242 is constructed of plastic in order to reduce manufacturing cost. The gear 242, however, is subject to considerable torsional stresses. The gear 42 includes a network of stiffening ribs arranged in a honeycomb-like structure which create stiffness in three planes to minimize twisting of the gear due to the three force vectors produced by the helical teeth. The network includes radially orientated ribs, tangentially orientated ribs, and ribs which are both tangentially and radially orientated. The network of stiffening ribs may be formed over a disk substrate if desired.

The worm gear 242 carries a multi-polar magnet 248, which is keyed relative to the gear by a key and otherwise retained by clips. The magnet 248 functions as another sensor for position sensing purposes. The output shaft 216 of the worm gear 242 is rotatably supported in the outlet 213 via a sleeve bearing.

A printed circuit board (PCB) 260 is mounted in the gearbox housing 212 against support surface 262. The PCB 260 can host the controller. A brush card 264, which includes brushes 266 for commutation of the motor, is electrically connected to the PCB 260. The brush card 264 is physically mounted in slots formed in the housing 212. A digital micro-controller 278 such as Mitsubishi part no. M30262F8GP is mounted on the PCB 260 and a flash memory for storing a servo-control program is connected to the micro-controller. The PCB 260 includes power switches such as FETs 270 which provide an H-bridge for controlling the motor. The PCB 260 also includes (on its underside, in FIG. 3) Hall effect sensors 272a, 272b for sensing magnet 234 and Hall effect sensors 280a, 280b for sensing magnet 248. Collectively, the PCB 260 and brush card 264 provide an on-board electronic servo-control system, i.e., a controller, such as controller 401.

The gearbox housing 212 is sealed with a cover 282, which may be made of metal, plastic, or another suitable material. An electrical connector 286 for connecting the PCB 260 to the vehicle control system is mounted atop the cover 282.

The PCB 260 and FETs 270 generate a significant amount of heat which must be dissipated. In an example embodiment, two layers of thermally conductive rubber 274, 276 are employed to protect the PCB 260 against shock and assist in dissipating heat. Rubber layer 274 is mounted between the bottom of the PCB 260 and a shelf 284 formed in the housing 212. The shelf 284 is integrated with a plurality of cooling fins formed on the exterior of the housing 212. Rubber layer 276 is disposed on top of the FETs 270 and is in contact with the metallic top cover 282 thus providing a low resistance heat conduction path to the other side of the housing.

An illustrative non-limiting example of a vehicle component motor operation is now made with reference to window wiper motor. A typical wiper movement cycle occurs in about one second, during which time the motor 210 must accelerate to operating speed, and then de-accelerate and brake as the wiper arm reaches its end of travel or turning position, following which the motor must again accelerate and brake as the wiper arm returns to its original position. Since it is preferred to use a relatively low torque, low cost motor, in a typical application the motor may be required to spin up to about 3000 rpm, brake and coast down to zero rpm in about 500 ms. In addition to these demanding performance requirements, it is simultaneously desirable to limit the output torque of the motor because the transition points on the worm 232 and worm gear 242 (i.e., the points on the gears corresponding to a change in rotational direction) will generally be at the same spot. At this point the wiper arms present a high inertial load, and hence a high impact load on specific gear teeth, leading to potential fatigue problems. Similarly, it is also desirable to minimize the current drawn by the motor. This is due in part to the fact that the motor is powered by a battery, which is limited in the amount of current it can supply. In addition, it is also desirable to minimize power ($I^2R$) losses resulting from high current draws, and thus limit heat dissipation requirements. The controller and motors can operate to produce a sound but not actuate the wipers. In an example, the motor 210 is moved in a first direction to a point where the wiper is not activated and then reversed in a second direction also to a point where the wiper is not activated. The motor 210 can repeat this cycle to create a sound from the activations and the vibrations of the motor 210.

Figure 3:
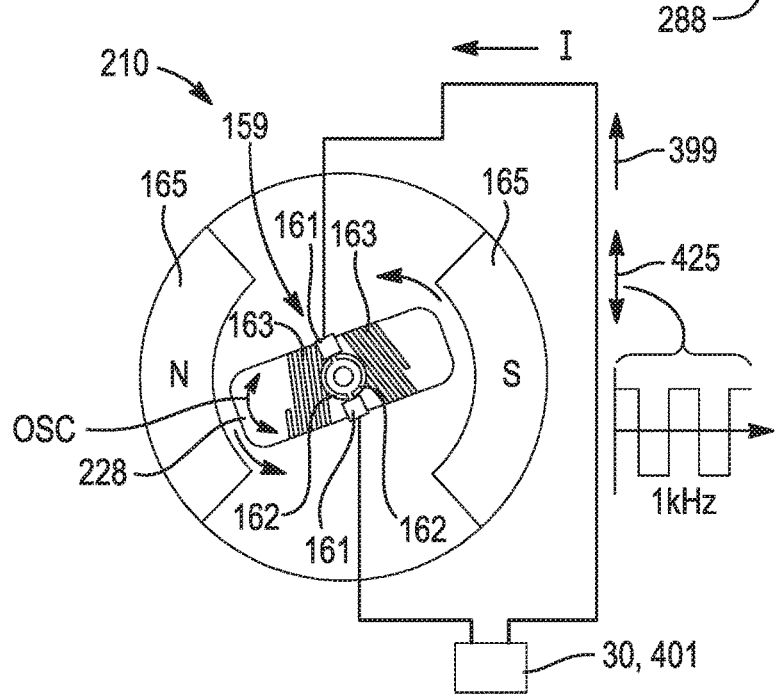
FIG. 3 is a schematic view of a motor in a vehicle in accordance with the present disclosure.

FIG. 3 is a schematic view of a motor 210 in a vehicle in accordance with the present disclosure. The motor 210 is illustrated as a 2-pole permanent magnet motor, and includes a pair of motor brushes 161, such as carbon brushes, and an armature 159 in the form of the rotor 228, having two commutator poles 162 each connected to a set of armature windings 163. The rotor 228 rotates as electrical current is supplied passed from one armature winding 163 to the next via the brushes 161 contacting the poles 162 to energize the armature windings 163 and produce a magnetic field to attract or repel the armature 159 towards or away from the permanent magnets 165. As the armature 159 rotates the motor brushes 161 create a short circuit between each adjacent commutator poles 162. Such a short circuit will decrease the armature resistance and cause an increase in the supplied current flow, thereby causing a ripple in the current proportional to the motor 210 rotational speed as generated by the induction of magnetic energy onto the motor commutator poles 162. It is recognized other configurations of the brushed motor 210 may be provided other than a 2-pole magnet motor. The current I can be controlled by the controller 30 to drive the motor 210 to produce the audible sound.

Auxiliary motors can also be brushless direct current motors that can receive a control signal and an auditory control signal from a controller.

Figure 4:
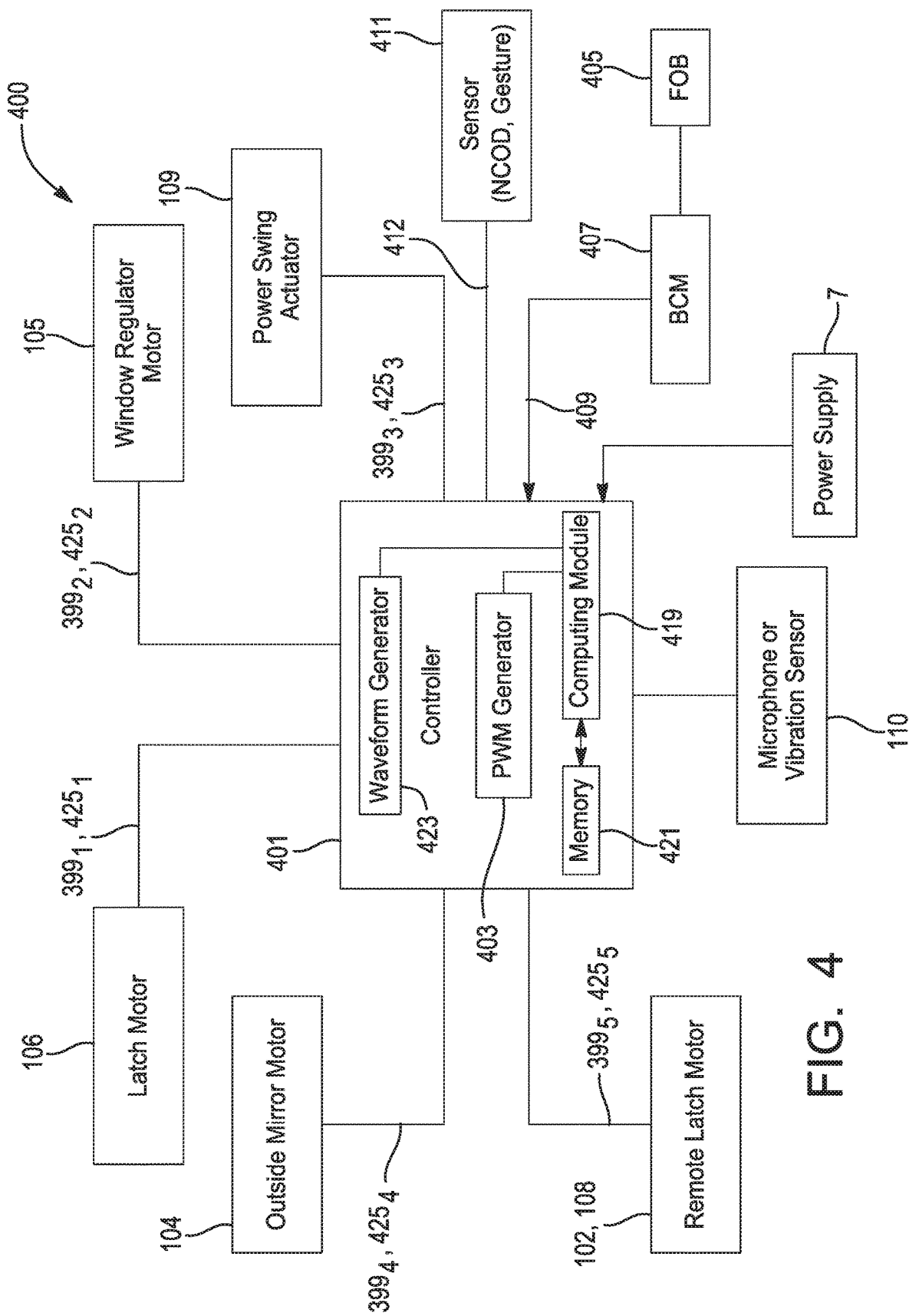
FIG. 4 is a schematic view of vehicle systems in accordance with the present disclosure.

FIG. 4 is a schematic view of a vehicle system 400 in accordance with the present disclosure. The vehicle system 400 includes a controller 401 that includes processor circuitry and memory in operable communication with the processor circuitry to load instructions to the processor circuitry and store inputs for the processor circuitry. In more detail, the controller 401 includes a control unit, for example provided with a computing module 419 such as a micro-controller or microprocessor coupled to an output module 403,423, such as a motion driver, which may include a pulse width modulation (PWM) generator 403 and/or and a waveform generator 423, to control their operation. It should be understood that the output module 403,423 may include an integrated circuit and/or discrete components. The output module 403,423 may be integrated with other elements of the controller 401.

The controller 401 has an embedded memory 421, for example a non-volatile random access memory 421, coupled to the computing module 419, storing suitable programs and computer instructions (for example in the form of a firmware). It is recognized that the controller 401 may alternatively comprise a logical circuit of discrete components to carry out the functions of the computing module 419 and memory 421. The controller 401 includes a motion driver 403, which can include a pulse width modulation (PWM) generator circuit 403 configured to generate a PWM signal having a variable duty cycle. The controller 401 includes a waveform generator 423 configured to generate an auditory control signal 425 such as a sine wave, or a square wave, illustratively a bi-directional waveform or alternating waveforms which alternate from a positive direction to a negative direction constantly crossing the zero axis point. Such bi-directional waveforms go through periodic changes in amplitude so as to cause a back and forth oscillation OSC of rotor 228, for a rapid change in motion of the rotor 228 between a first direction and a second opposite direction, and for example at a frequency of 1 kHz for generating a sound from the motor 210. A uni-directional waveform may also be provided to generate a vibration of the motor 210 by starting and stopping rotor 228 for example producing a start and stop oscillation OSC. Vibrating the rotor 228 at a frequency generates a sonic tone, or note, at a related frequency for providing the audible sound 114, 115, 116, 118, 119, with a pitch based on the frequency. The auditory control signal 425 may be tuned with the harmonic resonance of the individual motor 210 for generating a resonance vibration causing an increase in sound output from the motor 210. The single generator 403 can output control signals to one or more of the motors 102-109, 142 (FIG. 1).

The motion driver 403 can produce a motion control signal 399 in the form of different PWM control signals, referenced as $399_1$ to $399_5$ for the motors 102-109, 142, respectively, in the illustrated example of FIG. 4 for rotating the rotor 228 to actuate a corresponding vehicle component. In addition, waveform generator 423 can produce an auditory control signal 425, referenced as $425_1$ to $425_5$ for the motors 102-109, 142, respectively, to produce a desired or programmed audible sound. In addition, waveform generator 423 in conjunction with motion driver 403 can produce a combination motion and auditory control signal 399, 425 for the motors 102-109, 142 to produce the desired or programmed audible sound in addition to simultaneously causing a movement of the associated rotor 228 using the signal output of motion driver 403. Controller 401 may be programmed to control an H-bridge, also provided as part of motion driver 403, for changing the polarity of the motion control signal 399 supplied to the motor 210 and thus the direction of rotation of the rotor 228. The motion driver 403 can produce one or more auditory control signals $425_1$ to $425_5$ to produce the desired or programmed audible sound. One or more of the auditory control signals $425_1$ to $425_5$ can be different than the other auditory control signals $425_1$ to $425_5$. This can be based on the different operating characteristics of the motors 102-109, 142. The auditory control signals $425_1$ to $425_5$ can have a different currents and voltages as well as different cycles of the pulse width to activate, e.g., energize, a corresponding one of the motors 102-109, 142 to produce sound, but not have the motor 102-109, 142 mechanically operate (i.e. not produce an actuation torque that would cause a corresponding vehicle component to actuate).

Still referring to FIG. 4, the vehicle system 400 may include a fob 405 that can wireless communicated with an electronic control unit 407, e.g., a body control module (BCM), in the vehicle. The communication signal between the fob 405 and the electronic control unit 407 is typically encrypted. The fob 405 can send various instructions to the vehicle, e.g., unlock doors, open trunk, remote start, lock doors, and the like, which can require the activation of motors in the vehicle. The electronic control unit 407 validates the signal from the key fob 405 as valid for the vehicle and sends an alert activation signal 409 to the controller 401. The alert activation signal 409 can inform the controller 401 that a fob action is requested and to provide an audible sound using one or more of the motors 102-109, 142. The controller 401 generates an appropriate auditory control signal 425 to cause a motor to produce a sound. In an example embodiment, a motor 210 of the motors 102-109, 142 that is activated by an auditory control signal 425 does not impact the motor's ability to move to perform a mechanical operation. For example, one of the motors 102-109, 142 may be activated by an auditory control signal 425 to produce a sound while it is stationary and not mechanically operating. Additionally or alternatively, that same motor one of the motors 102-109, 142 may be activated by the auditory control signal 425 to produce the sound while it is mechanically operating for moving a corresponding vehicle component.

In an example embodiment, the fob 405 sends a signal to the electronic control unit 407 to unlock the vehicle and open the driver side door. The electronic control unit 407 validates this command from the fob 405 and sends a signal to the controller 401 to activate a motor or produce an auditory control signal to the motor. The controller 401 can activate the door latch motor 106 and the power swing actuator 109. The door unlocks, unlatches and is opened.

The controller 401 can also produce an auditory control signal to announce that the vehicle is performing the instructed action. The controller 401 can issue the signal 4254 to cause the side mirror motor 104 to produce the audible sound. In an example, the controller 401 can issue the signal $425_5$ to cause the latch motor 102 to produce the audible sound after it has unlatched the door in response to the command. In an example, the controller can issue the signal 4253 to cause the power swing actuator 109 to produce the audible sound after it has opened the door in response to the command. In one possible configuration, the audible sound is not generated when the vehicle component is operated, such as when the closure panel is being moved for example, but rather when the vehicle component is not being operated. The controller 401 may therefore be configured to output the auditory control signal 425 without outputting the motion control signal 399, wherein the vehicle component is not actuated when the controller 401 is outputting the auditory control signal 425. For example, seat motors and side rear view motors may not be caused to be operated to move the seat or side rear view mirrors to generate the audible warning, which otherwise may be a nuisance to the intended recipient of the audible warning e.g. the driver sitting in the driver's side seat viewing through the side rear view mirror when the audible warning is generated for a cyclist approaching from the rear of the vehicle towards the driver's side door.

The PWM generator 403 may produce and supply a signal to the latch motor 102 and/or the power swing actuator 109 which is sufficient to cause the motor 102 or actuator 109 to an activation point or beyond to cause the door to be unlatched or moved. That is, the PWM generator 403 can produce a duty cycle or amplitude that is sufficient to cause the latch motor 102 and/or the power swing actuator 109 to perform its associated motion task.

A sensor 411 is mounted to the vehicle and configured to sense various attributes of the vehicle or actions related to a person with reference to the vehicle. The sensor 411 can be in the vehicle cabin 140 and sense gestures of a person in the vehicle cabin 140, e.g., the sensor can be an imager with the ability to sense movement of a person in the vehicle cabin 140. The sensor 411 can be a touch screen device that senses physical contact or capacitive changes (or other Non-Contact Object Detection (NCOD)); closely adjacent the touch screen to determine gestures. The sensor 411 can be a sensor mounted outside the vehicle cabin 140 and directed to perform NCOD, e.g., using sonic sensing, RADAR, LIDAR and the like. The sensor 411 can sense objects adjacent the vehicle or gestures or other criteria inside the vehicle, for example within detection zones 1112 illustrated in FIG. 11D. The sensor 411 outputs a sensor signal to the controller 401. The sensor signal can be a binary signal that indicates that the sensor 411 has determined that a sensed criteria has been met, e.g., an object is close to the vehicle, presence in a seat, a gesture or the like. The sensor 411 can include processor circuitry to determine is the criteria is met. The sensor 411 can also output raw data to the controller 401 for it to process and determine is a sensed criteria is met. In response to the sensor signal, the controller 401, e.g., through its PWM generator 403, can produce the appropriate PWM signal, e.g., any one or more of the auditory control signals $425_1$ to $425_5$, to produce the audible sound.

The microphone (or other vibration sensor) 110 is mounted in the vehicle and can sense various sounds or vibrations at or in the vehicle. The microphone 110 can be in the vehicle cabin 140 and sense sounds or other vibrations in the vehicle cabin 140, e.g., spoken words by a person in the vehicle cabin 140. The controller 401 can have speech-to-text capability and based on the spoken sounds can trigger at least one of the motors, e.g., using one or more of the auditory control signals 425₁ to 425₅ signals to corresponding ones of the motors 102-109, 142. The sensor 411 can be a sensor mounted outside the vehicle cabin 140 and directed to perform NCOD, e.g., using sonic sensing, RADAR, LIDAR and the like. The sensor 411 can sense objects adjacent the vehicle or gestures or other criteria inside the vehicle. The sensor 411 outputs a sensor signal 412 to the controller 401 to indicate satisfaction of a criterion, such as detection of an object within a sensing region. The sensor signal 412 can be a binary signal that indicates that the sensor 411 has determined that a sensed criteria has been met, e.g., an object is close to the vehicle, presence in a seat, a gesture or the like. Alternatively or additionally, the sensor signal 412 can include other types of signals, such as analog signals indicating speed and/or position of a detected object. The sensor 411 can include processor circuitry to determine if the criteria is met. The sensor 411 can also output raw data to the controller 401 for it to process and determine is a sensed criteria is met. In response to the sensor signal 412, the controller 401, e.g., through its PWM generator 403, can produce the appropriate PWM signal, e.g., any one or more of the auditory control signals 425₁ to 425₅, to produce the audible sound triggered by the sensor 411.

Figure 5:
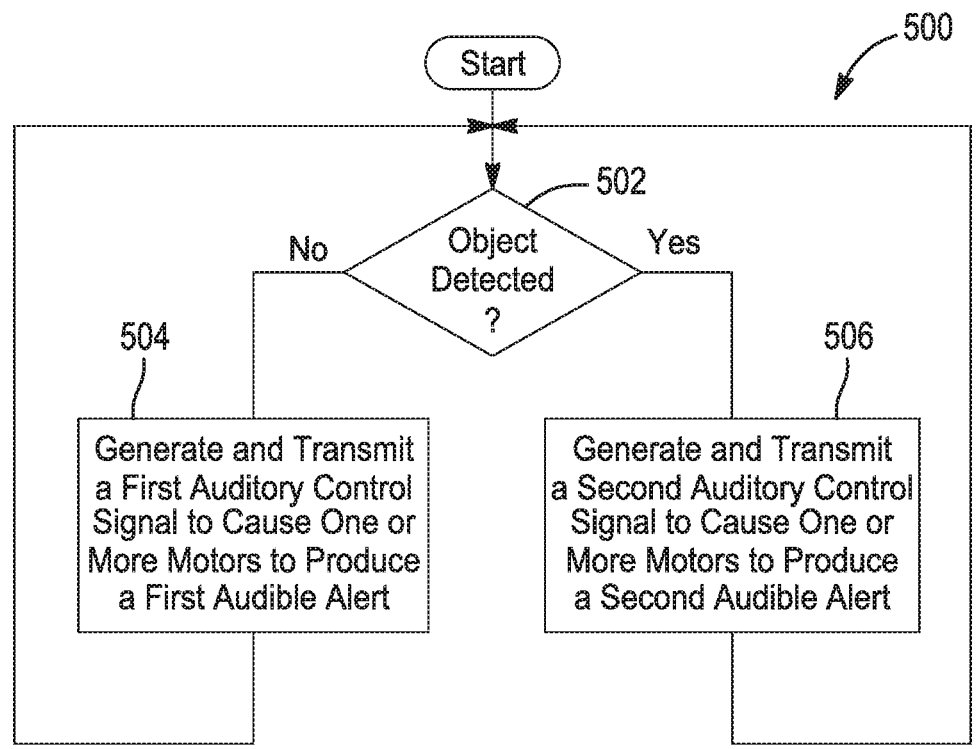
FIG. 5 is a flow chart showing steps in a method for producing audible sounds in accordance with the present disclosure.

FIG. 5 shows a method 500 for producing audible sounds in accordance with an aspect of the present disclosure. At step 502, a sensor determines if an object is detected. Such object detection may include detection of a person or an animal outside of the vehicle. The sensor may include one or more proximity sensors 411 or any other contact-type or non-contact object detection (NCOD) sensor, although other sensors, such as a gesture sensor, may be used.

At step 504, and in response to an object not being detected at step 502, a first auditory control signal 425a, such as a PWM signal, is generated and transmitted to one or more motors 102-109, 142 in the vehicle 101 to cause one or more of the motors 102-109, 142 to produce a first audible alert. In some embodiments, the first auditory control signal 425a may not mechanically operate the motor or motors 102-109, 142 and/or not affect normal mechanical operation of the motor or motors 102-109, 142. The motor or motors 102-109, 142, in response to the first auditory control signal 425a, produces the corresponding first audible alert to at least one of a passenger, driver, (in vehicle) or pedestrian (outside the vehicle). For example, the first auditory control signal 425a may cause one or more motors 102-109, 142 to produce a small amount of noise that can serve to warn pedestrians of the presence of the vehicle 101. This can enhance safety of a vehicle 101 that is otherwise producing little noise, for example when operating using electric propulsion.

At step 506, and in response to an object being detected at step 502, a second auditory control signal 425b, such as a PWM signal, is generated and transmitted to one or more motors 102-109, 142 in the vehicle 101 to cause one or more of the motors 102-109, 142 to produce a second audible alert. In some embodiments, the second auditory control signal 425b may not mechanically operate the motor or motors 102-109, 142 and/or not affect normal mechanical operation of the motor or motors 102-109, 142. The motor or motors 102-109, 142, in response to the second auditory control signal 425b, produces the second audible alert to at least one of a passenger, driver, (in vehicle) or pedestrian (outside the vehicle). For example, the second auditory control signal 425b may cause one or more motors 102-109, 142 to produce a warning tone that can serve to warn pedestrians of the presence of the vehicle and/or to warn the driver as to the presence of persons or objects detected near or in the path of the vehicle.

In some embodiments, the first auditory control signal 425b and/or the second auditory control signal 425b may be customized to an individual motor or motors 102-109, 142 to which each signal 425a, 425b is applied. In some embodiments, the first auditory control signal 425a may cause a single one of the motors 102-109, 142 to produce the first audible sound, and the second auditory signal 425b may cause a plurality of the motors 102-109, 142 to produce the second audible sound as a single tone, two or more different tones, and/or as a sequence of tones In some embodiments, an audible sound from a plurality of the motors 102-109, 142 can be a single tone or note from each of the plurality of motors. In some embodiments, each of the plurality of the motors 102-109, 142 may create different tones that combine together to form the audible sound. For a same tone, the motors 102-109, 142 can be synchronized to vibrate at a same frequency. For different tones, each of the motors 102-109, 142 can be activated at a different time. For example, a first one of the motors 102-109, 142 may be activated to produce an audible sound which may end when a second one of the motors 102-109, 142 is activated. A third one of the motors 102-109, 142 may be activated when the second one of the motors 102-109, 142 stops producing its corresponding audible sound. When the third one of the motors 102-109, 142 stops producing its corresponding audible sound, the first one of the motors 102-109, 142 can be activated or a fourth one of the motors 102-109, 142 may be activated. This example provides a sequential activation of the motors 102-109, 142 to produce the audible sound. In another example, the motor activations can overlap each other. The choice of the pattern of activation and/or whether an individual motor or a plurality of motors is be activated can be set and stored in the controller and activated for different purposes.

Figure 6:
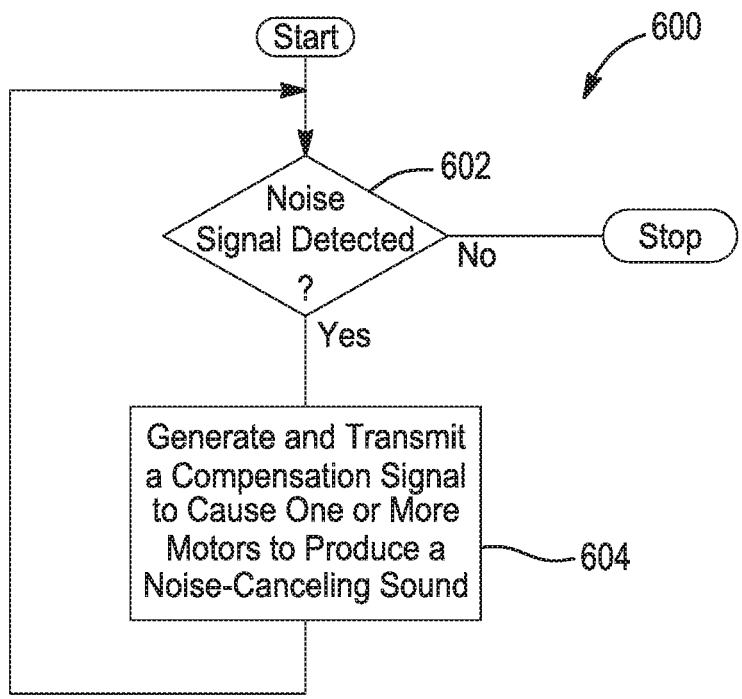
FIG. 6 is a method for producing audible sounds in accordance with the present disclosure.

FIG. 6 is a method 600 for noise cancelation in accordance with an aspect of the present disclosure. At step 602, a noise signal is detected. The noise signal may be a sound signal having a particular signature, such as a particular frequency, range of frequencies, periodicity, etc. The noise signal may be sensed either inside the vehicle cabin 140 or outside the vehicle 101. At step 604, a noise compensation signal is generated and transmitted to one or more motors to cause the one or more motors to produce a noise-canceling sound. The controller may produce the noise compensation signal in response to detecting a noise signal. The noise compensation signal may be, e.g., a PWM signal. For example, the motor or motors may resonate at a same frequency and out of phase with the noise signal to destructively interfere with the noise signal. The noise-canceling sound may be calculated to be most effective at a location of one or more listeners, such as a driver and/or passenger in the vehicle. Thus, the motor or motors can reduce or eliminate the noise signal or its perception by the listener or listeners.

Figure 7:
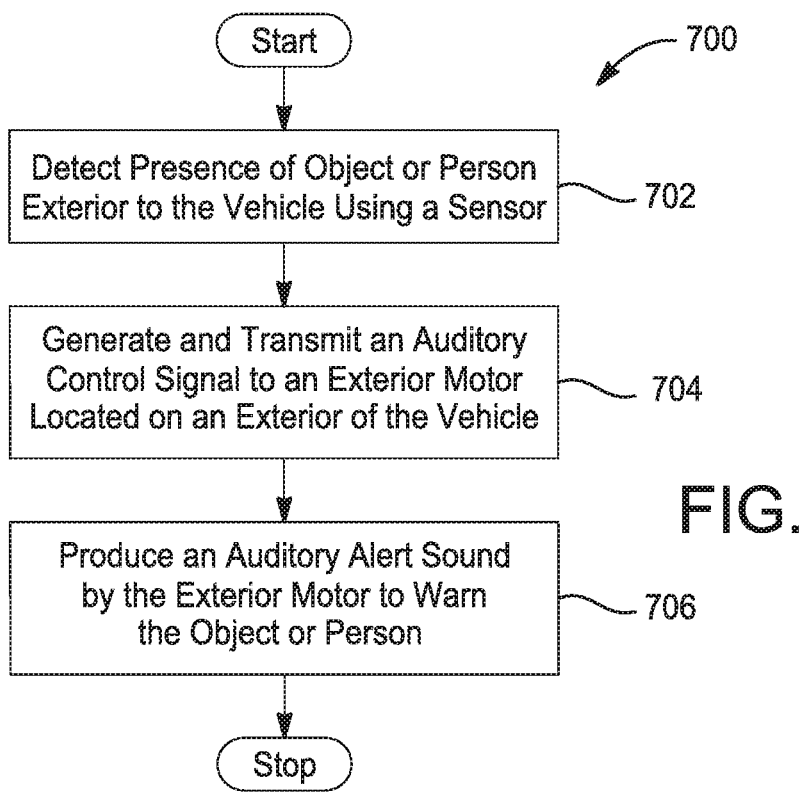
FIG. 7 is a flow chart showing steps in a method for producing audible sounds in accordance with the present disclosure.

FIG. 7 is a method 700 for producing external audible sounds in accordance with an aspect of the present disclosure. The method 700 may be implemented, at least in part, using software instructions stored in memory 421. At step 702, a sensor detects the presence of an object or a person exterior to the vehicle. The sensor may be, for example, imager, a sonic sensor, RADAR sensing system, a LIDAR sensing system, or a combination thereof. At step 704, an auditory control signal is generated and transmitted to an exterior motor located on an exterior of the vehicle. The exterior motor may be located, for example, within a part of the vehicle adjacent to an exterior surface. Alternatively or additionally, the exterior motor may be located within the vehicle and configured to transmit sound therefrom to a location outside of the vehicle. The auditory control signal may be, for example, a PWM signal to control the exterior motor to produce a sound as an audible sound. At step 706, the exterior motor produces an audible sound exterior to the vehicle to warn the object or person exterior to the vehicle. In the case of an object being detected, the direction of the audible sound can indicate to the driver the location of the object, e.g., an audible sound in the forward alert zone when the object or person is detected in front of the vehicle or an audible sound in the rear alert zone when the object or person is detected behind the vehicle.

Figure 8:
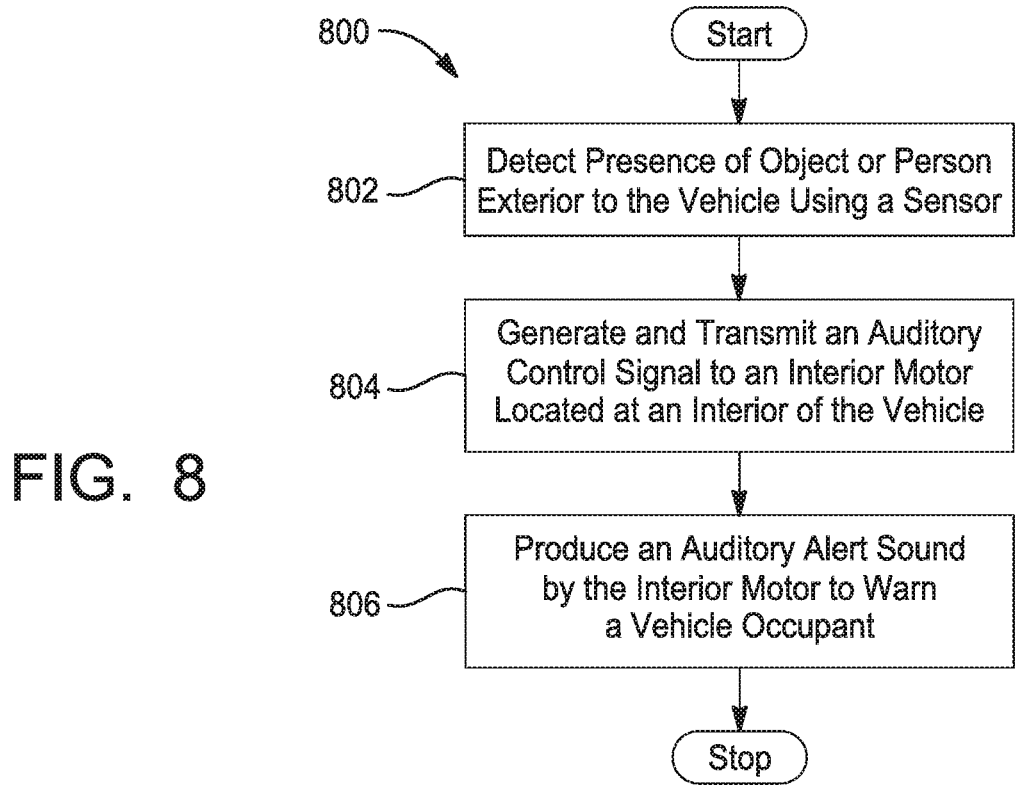
FIG. 8 is a flow chart showing steps in a method for producing audible sounds in accordance with the present disclosure.

FIG. 8 is a method 800 for producing internal audible sounds in accordance with an aspect of the present disclosure. The method 800 may be implemented, at least in part, using software instructions stored in memory 421. At step 802, a sensor detects the presence of an object or a person exterior to the vehicle. The sensor can be an imager, a sonic sensor, RADAR sensing system, LIDAR sensing system, or combinations thereof. At step 804, an auditory control signal is generated and transmitted to an interior motor located at an interior of the vehicle. The exterior motor may be located, for example, within the passenger compartment of the vehicle. Alternatively or additionally, the interior motor may be located within a component or a body panel of the vehicle and configured to transmit sound therefrom to a location inside of the vehicle. The auditory control signal may be, for example, a PWM signal to control the interior motor to produce a sound as an audible sound. At step 806, the interior motor produces an audible sound inside the vehicle cabin 140 to warn a vehicle occupant, such as the driver or passenger that an object, motion or person is detected outside the vehicle. In the case of an object being detected, the direction of the audible sound can indicate to the driver the presence and the location of the object. For example, different motors within the interior of the vehicle may produce the audible sound depending on the location of the detected person, object, or motion.

Figure 9:
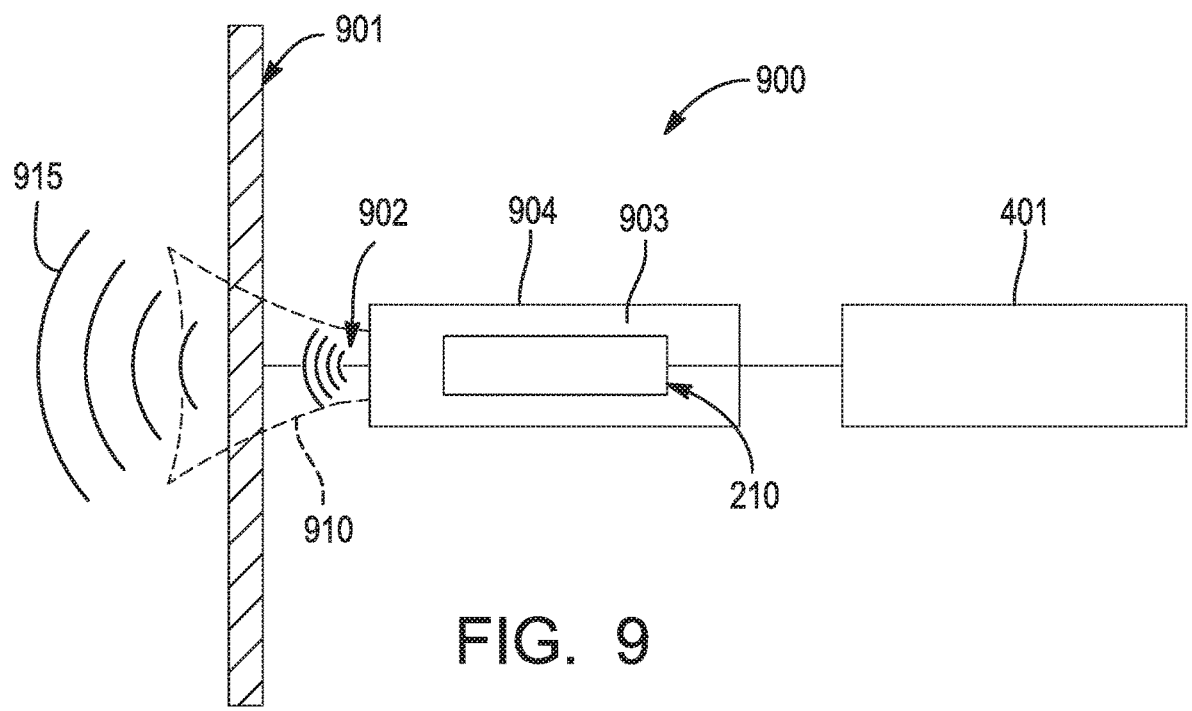
FIG. 9 is a schematic view of an audible sound producing system for a vehicle in accordance with the present disclosure.

FIG. 9 is a schematic view of an audible sound producing system 900 on a vehicle in accordance with the present disclosure. A structure 901, e.g., a support, sheet metal, a housing, a carrier, door panel, seat frame, exterior panel, and the like, is adjacent a motor 210 through which or around which the motor 210 is to produce an audible sound. The motor 210 is mounted in a cavity 903 of a motor support 904. In an example, the motor support can include the stator 226 and/or the housing 212 as shown in FIG. 2. The motor support 904 can be a housing, e.g., an enclosure that surrounds the motor 210 and protects the motor from the outside environment. The motor 210 includes motor windings or other armature 159, e.g., a rotor 228, that are vibrated to cause outside motor support housing, or enclosure, to vibrate at resonance frequency to create sound for the audible sound. Each motor support, e.g., a housing, has a resonance frequency at which the PWM signal to the motor, e.g., the windings can be tuned to produce the audible sound. The structure 901 can be formed to reinforcement or prolong the sound by reflection from a surface or by the synchronous vibration. That is, the structure 901 or the motor support 904 can act as a waveguide to direct and amplify the sound produced by the motor 210. When acting as a waveguide, the structure 901 or the motor support 904 guide a sound wave from the motor to produce the audible sound. The structure 901 or the motor support 904 can be part of the electromagnetic shielding for the motor or related circuitry. The structure 901 or the motor support 904 can provide sonic resonance with sound produced by the auxiliary motor to assist in producing the audible sound 915.

Figure 10:
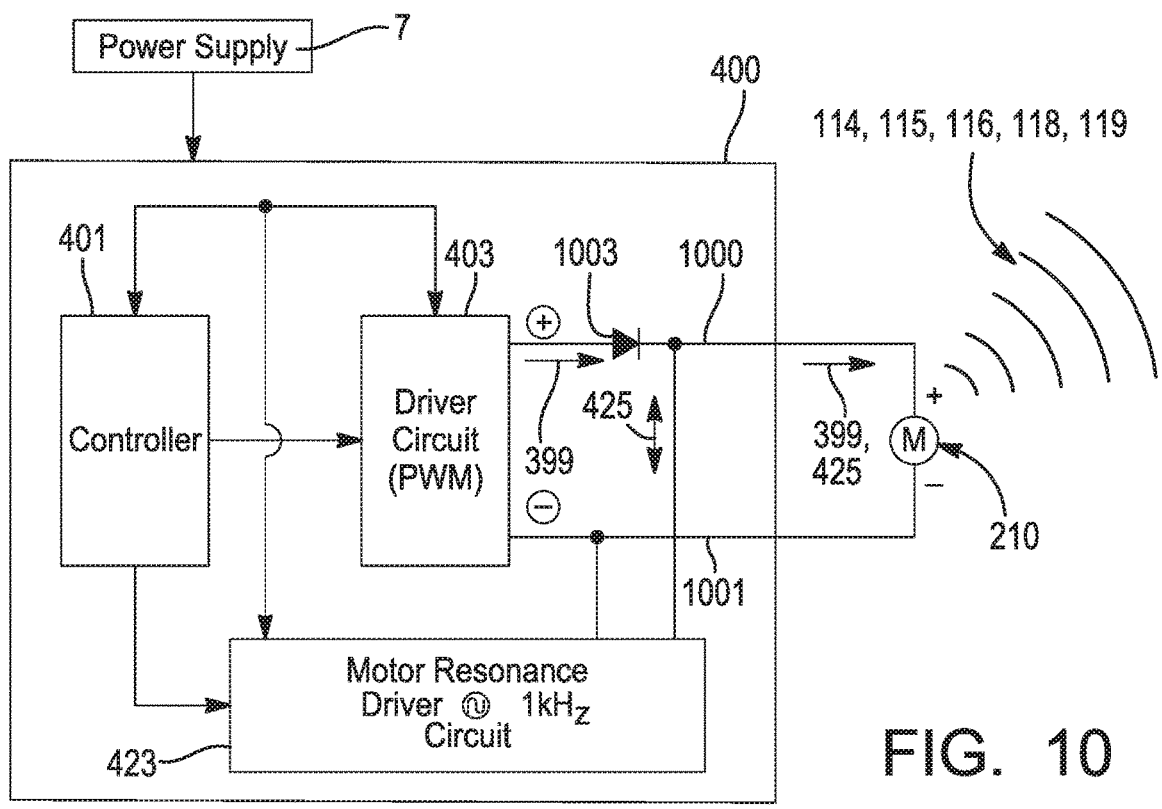
FIG. 10 is a circuit block diagram illustrating a motor driver circuit and a motor resonance driver circuit connected to a motor in accordance with an illustrative embodiment.

With reference to FIG. 10, motion driver 403, which may include a PWM driver circuit, and waveform generator 423, which may be called a motor resonance driver, are illustrated as controlled by controller 401 and as separate units. However, the waveform generator 423 may be included as part of the circuitry of the motion driver 403. Waveform generator 423 is shown as illustratively electrically connected in parallel arrangement with motor 210 over motor lines 1000 and 1001 for supplying the auditory control signal 425 to the motor 210. In some embodiments, and as shown in FIG. 10, the waveform generator 423 is configured to generate a 1 kHz sinusoidal resonance signal, however, the waveform generator 423 may generate a different (i.e. non-sinusoidal) signal and/or a different frequency that may be greater than or less than 1 kHz. In an embodiment, a diode 1003 is provided between an output of driver circuit 403 and an output of the waveform generator 423 to prevent the auditory control signal 425 from following a lower resistive path away from the motor terminals of motor 210 and towards the input of the driver circuit 403, effectively reducing the auditory signal generating power delivered to the motor 210 required to cause the generation of sound. In an embodiment, when controller 401 is controlling motion driver 403 simultaneously or in conjunction with waveform generator 423, the motion control signal 399 may affect the sound-producing oscillation motion of the rotor 228 in response to the auditory control signal 425. Controller 401 may therefore be configured to modify the auditory control signal 425, for example increase the duty cycle of auditory control signal 425 to compensate for such an effect on the sound-producing oscillation of the rotor 228. More specifically, the controller 401 may be configured to modify the duty cycle of auditory control signal 425 as a function of a frequency, duty cycle, and/or amplitude of the motion control signal 399.

In an example embodiment, a waveguide 910 is provided in communication with the motor 210 to guide the vibrations and/or soundwaves from the motor 210 to and/or through the structure 901. The waveguide 910 may be in fluid communication with and/or mechanically coupled to the motor 210. The waveguide 910 can be a horn connecting the motor 210 or motor support 904 to the structure 901. The waveguide 910 can be a solid body connecting the motor 210 or motor support 904 to the structure 901. The waveguide 910 may be disposed adjacent the motor 210 to guide a sound wave to produce the audible sound. The waveguide 910 can be part of the electromagnetic shielding for the motor 210 or related circuitry. The waveguide 910 can be integrated into the housing 212 (FIG. 2), e.g., shaping any of the housing components. The waveguide 910 can operate with sonic resonance with sound produced by the motor 210 to amplify the audible sound.

Figure 11A:
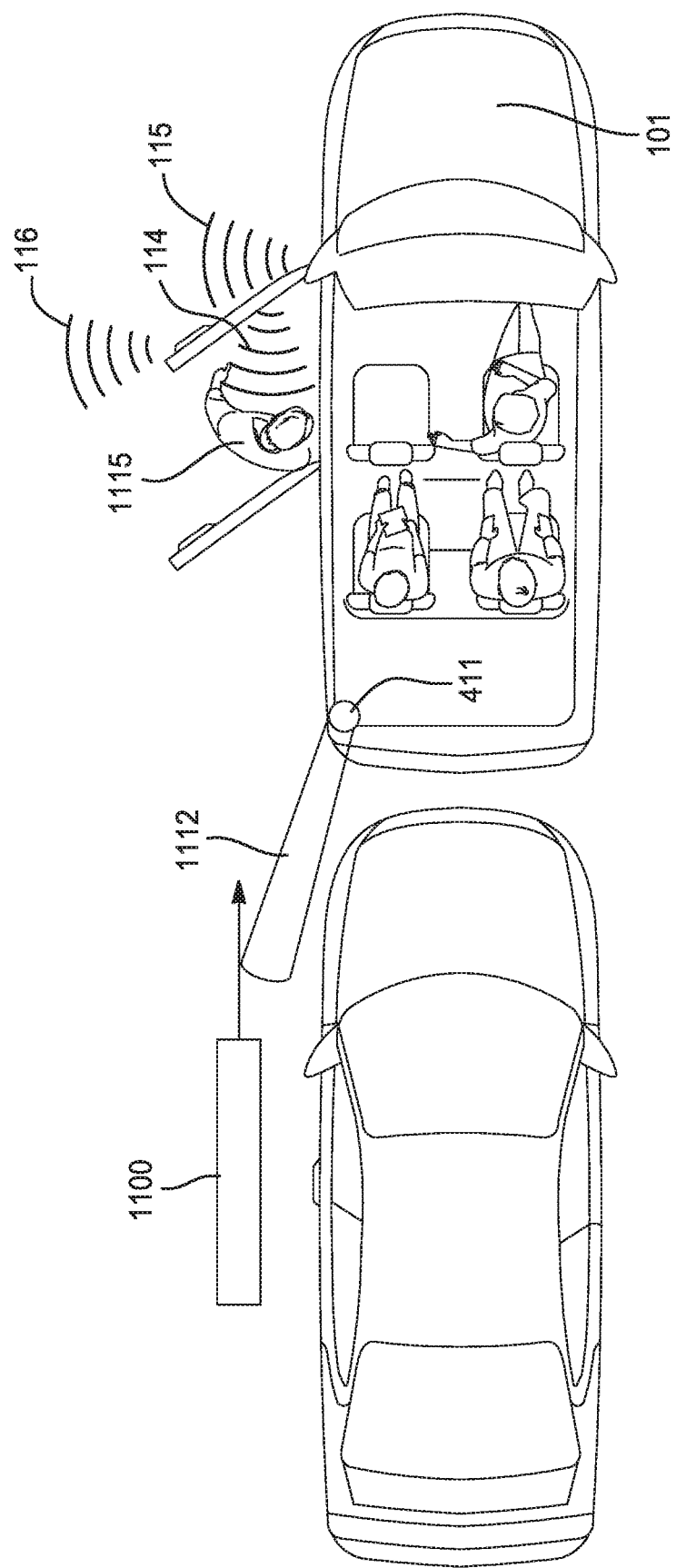
FIGS. 11A to 11D are illustrative operations of a motor vehicle audible sound system, including multiple component motors for producing audible sounds.
Figure 11B:
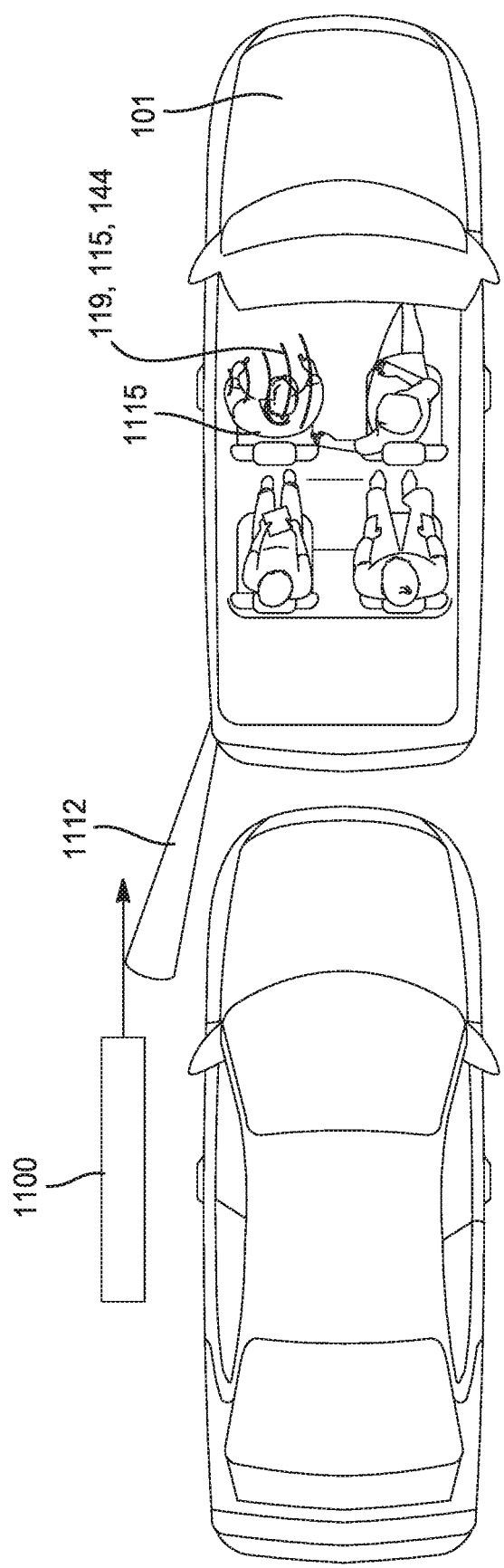
Figure 11C:
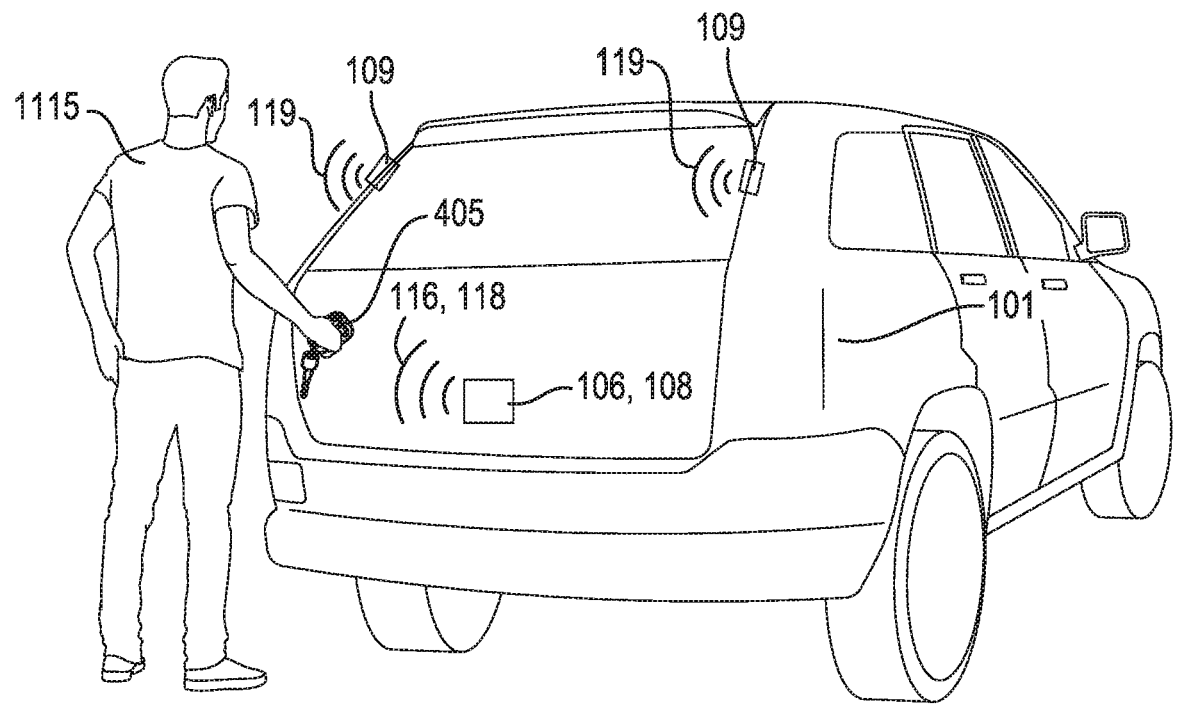
Figure 11D:
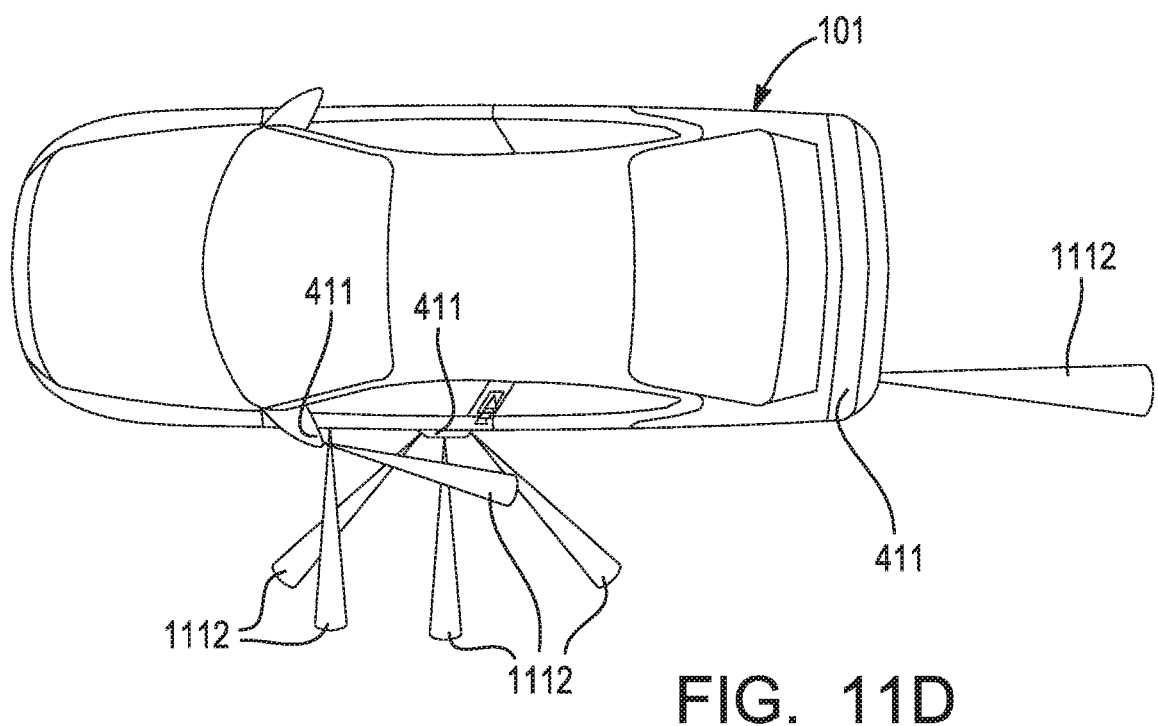

Now referring to FIG. 11A, there is illustrated operation of vehicle system 400 for user 1115 of an approaching cyclist 1100 using vehicle components, such as window regulator motor 105, side mirror motor 104, and door latch motor 106 for generating an audible sound, when cyclist 1100 is detected using proximity sensors 411 detecting the cyclist 1100 approaching from the rear of the vehicle 101. Now referring to FIG. 11B, there is illustrated operation of vehicle system 400 for user 1115 of an approaching cyclist 1100 using vehicle components, such as window regulator motor 105, and power swing door motor 109, and seat motor 142 for generating an audible sound to the user to avoid opening the door 12, when cyclist 1100 is detected using proximity sensors 411 detecting the cyclist 1100 approaching from the rear of the vehicle 101. Now referring to FIG. 11C, there is illustrated operation of vehicle system 400 for user 1115 confirming an unlock command issued by fob 405, for example in the form of an audible sound 119, 116, 118 generated by power swing door motor 109 and/or litigate motor 108.

Figure 12:
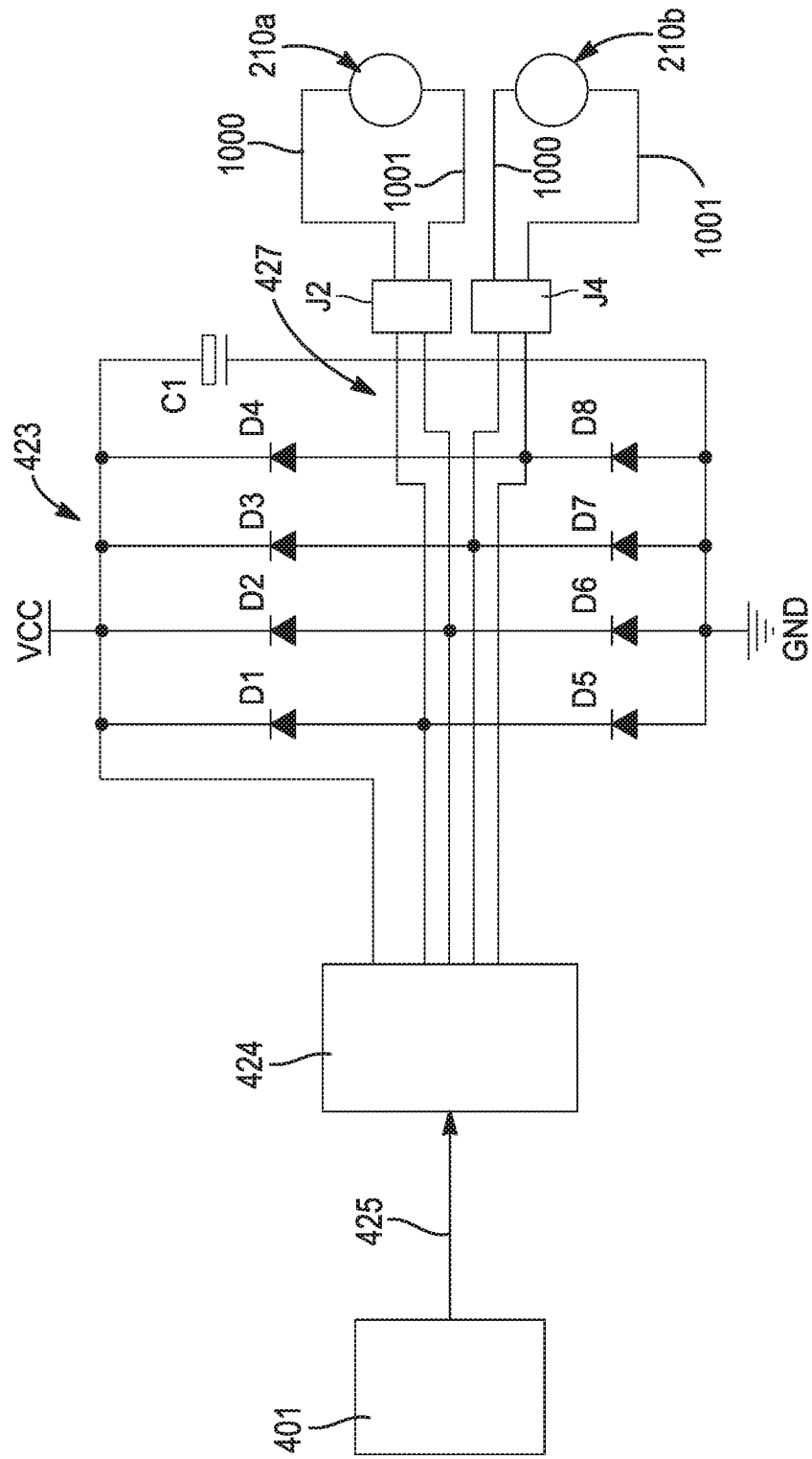
FIG. 12 is an illustrative example of an motor resonance circuit, in accordance with an illustrative embodiment.

Now referring to FIG. 12, there is provided an illustrative circuit of the waveform generator 423. Waveform generator 423 includes a driving microchip 424 in communication with controller 401 and configured to receive, at its input, an auditory control signal 425, which may be representative of a desired tone to be generated by the motor or motors 210a, 210b, and to generate a motor driving signal on motor driving lines 427 connected to motor lines 1001 via connections J2. A second connection J4 may be provided in connection with a second motor 210b power supply lines, such that waveform generator 423 is connected to two motors 210a and 210b for generating tones by each motor 210a and 210b separately.

Figure 13:
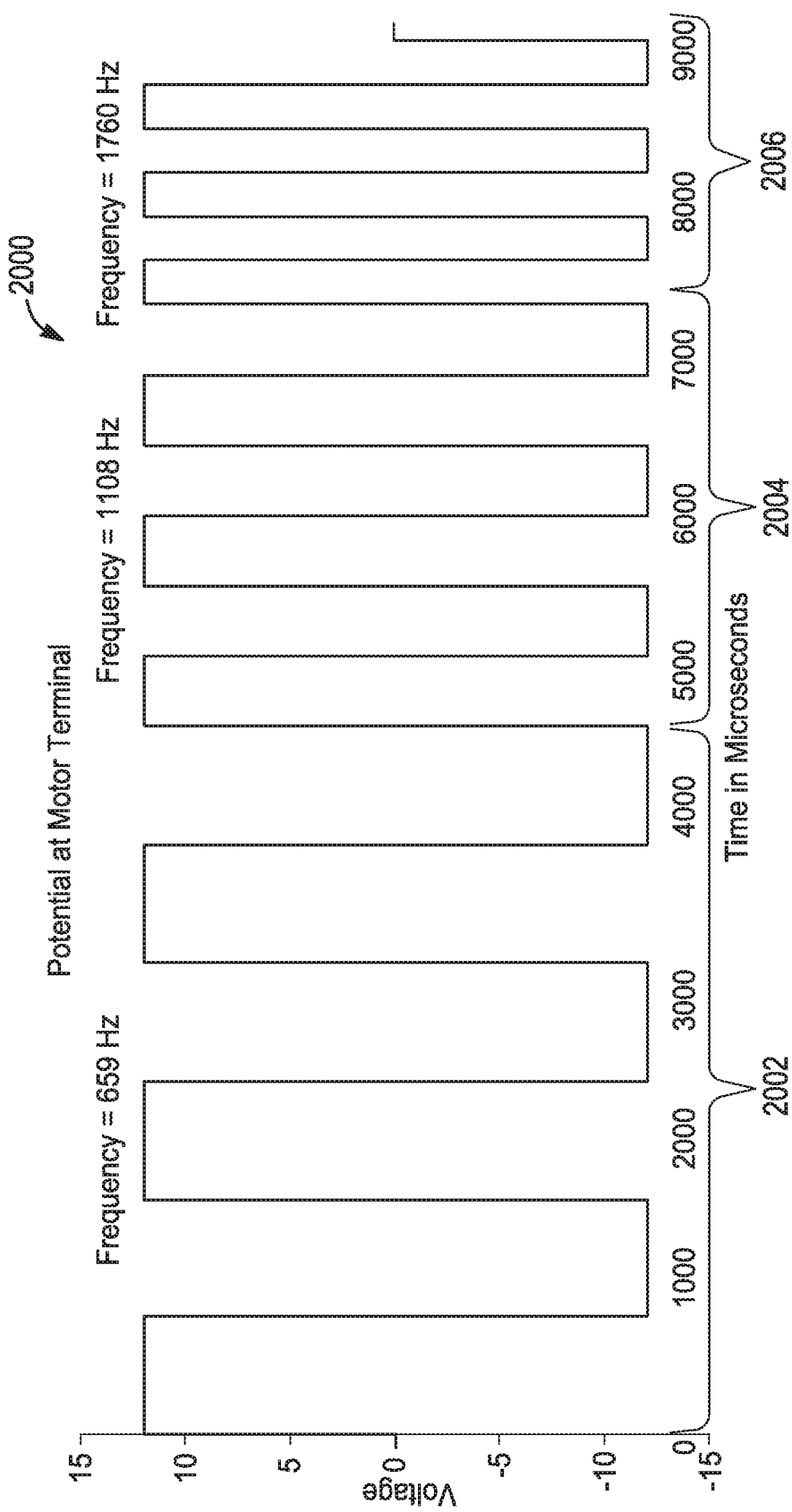
FIG. 13 is an illustrative example of an output signal of the motor resonance driver circuit of FIG. 10 representing three different tones that to be generated by the motor.

Now referring to FIG. 13 there is illustrated an exemplary output signal 2000 of the waveform generator 423 of FIG. 10, representing three different tones that can be produced by the motor 210 or motors 210a, 210b. FIG. 13 plots the potential at a motor terminal on a voltage scale of +15 V to −15V vs. time over a range of 0 to 9000 microseconds. The three different tones to be produced by motor 210 or motors 210a, 210b in response to the supply of three output signals 2002, 2004, 2006 each have a distinct amount of time each tone producing output signal 2002, 2004, 2006 must spend in each polarity, for example a positive and a negative polarity. The lower the frequency of the output signals 2002, 2004, 2006, the lower the pitch of the tone generated by the motor 210 or motors 210a, 210b. The first output signal 2002 has a frequency of 659 Hz; the second output signal 2004 has a frequency of 1108 Hz; and the third output signal 2006 has a frequency of 1760 Hz. However, these are merely examples, and any or all of the output signals 2002, 2004, 2006 may have a different frequency.

Figure 14:
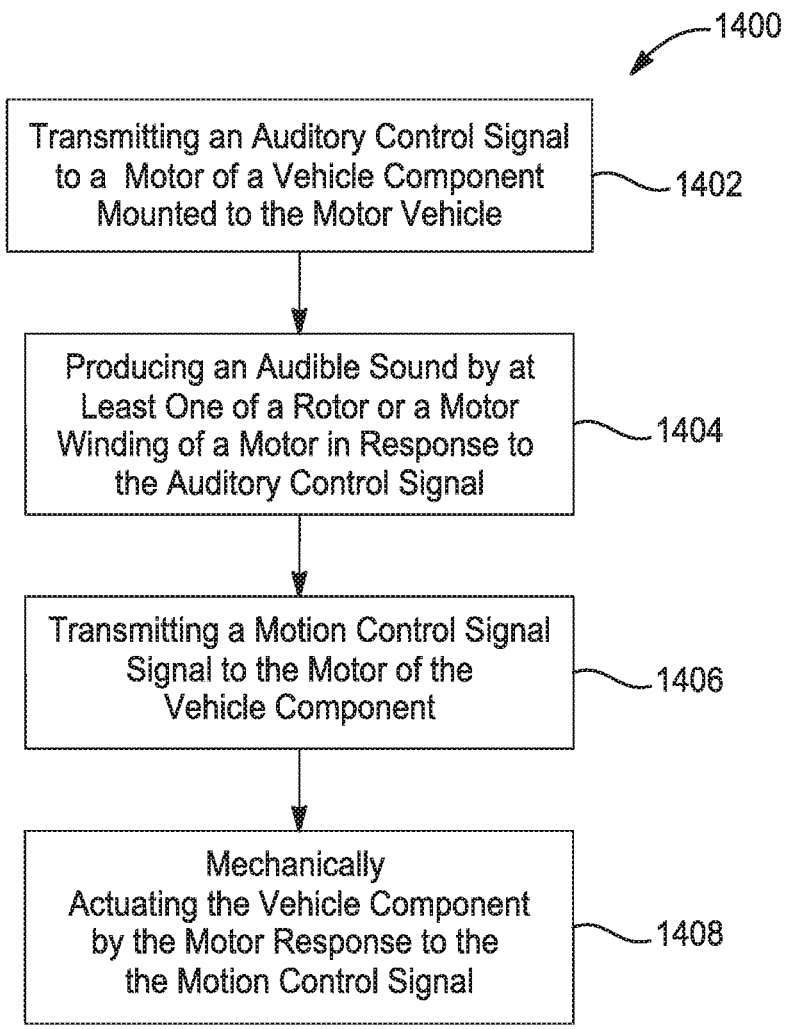
FIG. 14 is a flow chart showing steps in a method of generating an audible sound using a motor vehicle component.

FIG. 14 is flow chart showing steps in a method 1400 of generating an audible sound using a motor vehicle component in accordance with an aspect of the present disclosure. The method 1400 may be implemented, at least in part, using software instructions stored in memory 421. The method 1400 includes transmitting an auditory control signal 425 to a motor of a vehicle component mounted to a motor vehicle at step 1402. The method 1400 includes transmitting an auditory control signal 425 to a motor 102-109, 142 of a vehicle component mounted to a motor vehicle at step 1402. The method 1400 also includes producing an audible sound by at least one of a rotor 228 or a motor winding of the motor 102-109, 142 in response to the auditory control signal 425 at step 1404. The method 1400 may also include transmitting a motion control signal 399 to the motor 102-109, 142 of the vehicle component at step 1406, which may also include not transmitting the auditory control signal during the transmitting of the motion control signal 399. The method 1400 may also include mechanically actuating the vehicle component by the motor 102-109, 142 in response to the motion control signal at step 1408.

Embodiments of the present disclosure may improve audible sounds from the motor vehicle 101. Motor vehicles include a plurality of motors that are controlled by controller circuitry, such motors include motors in the vehicle cabin 140 and motors outside the vehicle cabin 140. Cabin audible sounds can be produced by multiple interior motors, e.g., power seat motors 142, power window motors, door lock actuators, sunroof motors 107, window regulator motors 105 and the like. Exterior audible sounds, e.g., for pedestrians, can be produced by utilizing motors that produce sounds outside the vehicle cabin 140. These exterior audio producing can include, but are not limited to, motors to control side mirror, door latches, trunk lids, window regulators, power spindles, power deck lids, sunroofs, headlamps, and whatever other components that contains a motor or solenoid winding.

The use of multiple power seat motors can produce audible sounds in addition to vibrations alerts. For example, the driver can receive a vibration alert in the driver seat and the audible sound can be produced by the motor in the driver seat along with motors in other seats, e.g., the rear seat(s) or the passenger seat.

The audible sounds are sounds that are produced by the motors. Similar motors can produce a sound out of phase with motors that are actuated to perform their principal tasks and operate to cancel the noise of the motor. The motors can provide noise cancellation. For example the driver side mirror is being adjusted. The passenger side mirror motor 104 can be actuated out of phase to the driver side mirror 104 to cancel or to reduce the sound form the actuated driver side mirror. Other interior motors can be energized to generate a vibration and to reduce the noise from actuated motors in a vehicle, such as noise from actuating one or more doors, gates, and/or sunroofs.

The audible sounds created by motors in the vehicle can be used to replace speaker generated tones and sounds. The audible sounds created by motors can be an alternative for remote device control sounds, such as key fob chirps for lock/unlock or remote start.

The motors could be mounted in or adjacent to one or more waveguides, e.g., horns, to direct sound in a desired direction. A waveguide can act as an amplifier to increase the perceived loudness or change the tone of the sound from the motor. The waveguide can be sheet metal enclosing the motor or adjacent the motor. The waveguide can be part of the electromagnetic compatibility sleeves associated with the motors to create an amplified signal or modified signal.

The foregoing description of the embodiments describes some embodiments with regard to motor vehicles. This phrase is used for convenience of description. The phrase motor vehicle as used herein includes any vehicle for transporting people, animals or goods. The vehicles can include, but is not limited to, passenger vehicles, vans, motorcycles, scooters, bicycles, pickup trucks, buses, semi-trucks, vessels, boats, ships, aircraft, airplanes, gliders, helicopters, drones, trains, subways, trolleys, trams, amphibious vehicles, snow machines, and the like. Vehicles can be driven by a person or be autonomous, e.g., unmanned.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for a vehicle, comprising:
at least one auxiliary motor configured to mechanically operate a vehicle component based on receiving a motion control signal;
wherein the at least one auxiliary motor is configured to produce an audible sound based on receiving an auditory control signal, and wherein the audible sound generated is a noise-cancelling sound.

2. The system of claim 1, further comprising a waveguide in communication with the at least one auxiliary motor to amplify and direct the audible sound.

3. The system of claim 2, wherein the waveguide is part of an electromagnetic shielding for the at least one auxiliary motor or related circuitry.

4. The system of claim 2, wherein the waveguide is configured to resonate a sound produced by the at least one auxiliary motor to amplify the audible sound.

5. The system of claim 1, wherein the noise-cancelling sound is for canceling out or reduce a sound perceivable at or around the vehicle.

6. The system of claim 5, wherein a sensor is provided to detect the sound perceivable at or around the vehicle.

7. The system of claim 1, further comprising a controller configured to output the auditory control signal and the motion control signal.

8. The system of claim 7, wherein the controller is configured to output the auditory control signal to cause the at least one auxiliary motor to produce the audible sound to cancel a noise produced by the at least one auxiliary motor.

9. The system of claim 7, wherein the controller is further configured to detect the sound perceived at or around the vehicle.

10. The system of claim 9, further comprising a microphone to detect the sound.

11. The system of claim 1, wherein the at least one auxiliary motor includes at least one motor selected from a group comprising: a seat motor, a sunroof motor, a door latch motor, a liftgate motor, a power-operated swing door actuator motor, and a window regulator motor.

12. The system of claim 5, further comprising a controller configured to detect a noise signal of the sound and generate a noise compensation signal for transmission to the at least one auxiliary motor to produce the audible sound.

13. The system of claim 12, wherein the produced audible sound is out of phase with the sound to destructively interfere with the sound.

14. The system of claim 5, further comprising a controller configured to output the auditory control signal while outputting the motion control signal, wherein the noise generated by the vehicle component is cancelled when the controller is outputting the auditory control signal.

15. A system for a vehicle, comprising:
at least one auxiliary motor configured to mechanically operate a vehicle component based on a motion control signal and to produce an audible sound; and
a controller configured to output at least one of the motion control signal and an auditory control signal to actuate the at least one auxiliary motor to produce the audible sound to cancel noise generated by the actuation of the at least one auxiliary motor.

16. The system of claim 15, further comprising a sensor for sensing a noise signal for cancellation by the audible sound.

17. A method of generating an audible sound in proximity to a motor vehicle, comprising:
sensing a sound signal;
transmitting an auditory control signal to an auxiliary motor of a vehicle component mounted to the motor vehicle; and
producing the audible sound by the auxiliary motor in response to receiving the auditory control signal, wherein the audible sound is a noise cancelling sound.

18. The method of claim 17, wherein the noise cancelling sound is generated by the auxiliary motor to destructively interfere with the sound signal.

19. The method of claim 17, wherein the noise cancelling sound is out of phase with the sound signal.

20. The method of claim 17, further comprising:
transmitting a motion control signal to the auxiliary motor of the vehicle component during transmitting the auditory control signal; and
mechanically actuating the vehicle component by the auxiliary motor in response to the motion control signal, wherein a sound generated during mechanically actuating the vehicle component by the auxiliary motor in response to receiving the motion control signal is eliminated or reduced by the audible sound produced by the auxiliary motor in response to receiving the auditory control signal.

* * * * *